US005561795A

United States Patent [19]

Sarkar

[11] Patent Number: 5,561,795
[45] Date of Patent: Oct. 1, 1996

[54] METHOD AND APPARATUS FOR AUDIT TRAIL LOGGING AND DATA BASE RECOVERY

[75] Inventor: Shyam S. Sarkar, Roseville, Minn.

[73] Assignee: UNISYS Corporation, Blue Bell, Pa.

[21] Appl. No.: 242,507

[22] Filed: May 13, 1994

[51] Int. Cl.$^6$ .................. G06F 7/10; G06F 7/20; G06F 17/30; G06F 12/00
[52] U.S. Cl. .................. 395/600; 364/DIG. 1; 364/221.9; 364/222.81; 364/222.82; 395/445
[58] Field of Search .................. 395/600, 425; 364/200

[56] References Cited

U.S. PATENT DOCUMENTS

| | | | |
|---|---|---|---|
| 4,819,150 | 4/1989 | DeLorme et al. | 364/200 |
| 4,819,156 | 4/1989 | DeLorme et al. | 364/200 |
| 4,878,167 | 10/1989 | Kapulka et al. | 364/200 |
| 5,032,979 | 7/1991 | Hecht et al. | 364/200 |
| 5,043,866 | 8/1991 | Myre et al. | 364/200 |
| 5,193,162 | 3/1993 | Bordsen et al. | 395/425 |
| 5,253,361 | 10/1993 | Thurman et al. | 395/600 |
| 5,280,612 | 1/1994 | Lorie et al. | 395/600 |
| 5,381,545 | 1/1995 | Baker et al. | |
| 5,404,508 | 4/1995 | Konrad et al. | 395/600 |

*Primary Examiner*—Thomas G. Black
*Assistant Examiner*—Cheryl Lewis
*Attorney, Agent, or Firm*—Charles A. Johnson; Mark T. Starr

[57] ABSTRACT

The disclosure relates to a transaction processing system where audit information for database updates and the status of transactions in process is sequentially written in audit records in an audit file, where the audit file may be used to restore the database to a consistent state following a system failure. The invention decreases the overhead processing required for auditing, and at the same time minimizes the impact the auditing has on the processing time required for restoring the database. A value which references the location in the audit file at which recovery of the database may begin is conditionally updated each time a page of the database which is cached in the main memory of the data processing system is written to non-volatile storage, based upon the position of the earliest written audit record which is associated with the cached page. In addition, when processing of a transaction is complete, the transaction identifier of the oldest incomplete transaction is saved in the audit record for the completed transaction. When restoring the database to a consistent state, the value which is maintained according to the earliest written audit record and the transaction identifier of the oldest incomplete transaction are used as reference points in the audit file to minimize the processing required to restore the database.

21 Claims, 15 Drawing Sheets

BEGIN-OF-TRANSACTION (BOT) AUDIT RECORD

COMMIT AUDIT RECORD

PHYSICAL AND PHYSICAL/FUNCTIONAL AUDIT RECORD

| 0 | TRANSACTION NUMBER | START TIME | POINTER |
|---|---|---|---|
| 1 | TRANSACTION NUMBER | START TIME | POINTER |
| 2 | TRANSACTION NUMBER | START TIME | POINTER |
| | TRANSACTION CONTROL TABLE | | |
| 255 | TRANSACTION NUMBER | START TIME | POINTER |

METHOD AND APPARATUS FOR AUDIT TRAIL LOGGING AND DATA BASE RECOVERY

BACKGROUND OF THE INVENTION

1. Field of the Invention

This invention generally relates to database systems and more particularly to recovery of a database after a system failure.

2. Description of the Prior Art

Databases have played a critical role in business areas such as banking and airline reservations for quite some time. These two lines of business illustrate how critical availability of a database can be. If a bank cannot process customer transactions (deposits, payments, transfers, etc.) because of a computer system failure, a customer may be unable to accomplish its business. Likewise, if an airline is unable to book reservations, customers may be lost and its planes may fly empty. Therefore, database availability is critical to some businesses.

While great strides have been made toward providing fault tolerant computer systems, some components are still subject to failure, and therefore an efficient database recovery strategy must be in place to minimize the time that transactions cannot be processed against the database. As illustrated with the airline reservation system, if the database recovery process takes too long, the delay may result in passengers taking their business to another airline. Thus, the recovery strategy must be efficient to minimize the time that the database is unavailable.

A database must be brought to a consistent state after a computer system failure in order to correctly recover a database. That is, any updates to the database which were caused by transactions which were in process but had not completed at the time of the system failure, must be undone. And any database updates caused by transactions that had completed prior to the computer system failure must remain in the database. Transaction processing and recovery theory is more fully discussed in "An Introduction to Data Base Systems", Vol. 1, 4th Edition, by C. J. Date and published by Addison-Wesley Publishing Co. at Chapter 18.

As described in U.S. Pat. No. 4,819,156 entitled "Database Index Journaling for Enhanced Recovery," to DeLorme, et al. (hereinafter referenced as "DeLorme"), a database may be comprised of database records and a database index. The database records contain the data the user inputs to the database and the index contains the data structures used to reference selected data in the database. Well known database index methods include hashing and use of $B^+$-trees.

Both the database records and the database index must be made consistent to correctly recover a database. DeLorme further points out that at the time of computer system failure, a transaction may have caused the index to be updated but the record may not have been updated with the most recent data. In addition, if the database system includes cache processing for caching in main memory the database index and database records, the affected portions of the database index or the updated database record may not have been written to non-volatile storage (such as a magnetic disk) at the time of the computer system failure.

As described in great detail in U.S. Pat. No. 5,043,866, entitled "Soft Checkpointing System Using Log Sequence Numbers Derived from Stored Data Pages and Log Records for Database Recovery" to Myre etal. (hereinafter referenced "Myre"), the efficiency of database recovery largely depends on the technique employed to log to a file the status of transactions processed and corresponding database updates. Throughout the remainder of this specification, the process of logging status information and database updates will be referred to as "auditing" and the file to which information is logged is the "Audit File." The process of auditing in turn affects the rate of transaction processing. Auditing adds to transaction processing overhead and therefore reduces transaction processing throughput, but is necessary for recovering from system malfunctions.

Myre teaches the method of "soft" checkpointing to accomplish auditing with minimal overhead while minimizing the portion of the audit file that must be processed in order to recover a database. Periodically, the MINBUFLSN and LOWTRANLSN values are stored in the log (herein "audit") file. MINBUFLSN is the record number or "Logical Sequence Number" of the record in the audit file that contains the update to the page in cache that was updated prior to any other "dirty" page in cache. Thus, MINBUFLSN identifies the point in the audit file after which operations in the audit file may need to be redone. Any updates to cache pages audited in records preceding MINBUFLSN in the audit file have already been destaged to disk. LOWTRANSLSN is the record number of the record in the audit file that contains the first audit record relating to the oldest uncommitted transaction. Both MINBUFLSN and LOWTRANSLSN are stored in the header of the audit file. At recovery time, the minimum of MINBUFLSN and LOWTRANSLSN is used as the point in the audit file at which recovery should begin. Because MINBUFLSN and LOWTRANSLSN are only stored periodically, the starting point for recovery as identified by the minimum of MINBUFLSN and LOWTRANSLSN is only an approximation of the actual optimal point in the audit file at which recovery should begin. The reason that Myre only provides an approximation is because between the time that the checkpoint of LOWTRANSLSN and MINBUFLSN is done and the computer system fails, additional transactions may have committed, thereby making the value of LOWTRANSLSN in the header of the audit file less than the optimal value leading to processing a greater portion of the audit file for recovery and increased recovery time. The method of Myre may also add unnecessary overhead in processing transactions because the checkpoint operation is performed without regard to whether LOWTRANSLSN or MINBUFLSN had actually changed.

It would therefore be desirable to have a method that minimizes the processing overhead involved in auditing database updates and that accomplishes database recovery in a timely manner by only processing the portion of the audit file that is necessary.

SUMMARY OF THE INVENTION

It is an object of the invention to minimize the processing overhead involved in auditing database updates.

Another object is to process only the portion of the audit file that is necessary in restoring a database to a consistent state following a system failure.

A further object of the invention is to minimize the processing overhead involved in auditing database updates and to process only the portion of the audit file that is necessary to restore a database to a consistent state following a system failure.

Yet another object of the present invention is to optimize functional-undo processing whereby functionally undoing a delete operation does not require a full insert operation.

According to the present invention, the foregoing and other objects and advantages are attained in a transaction processing system where audit information for database updates and the status of transactions in process are sequentially written in audit records in an audit file. The invention decreases the overhead processing required for auditing and minimizes the impact the auditing has on the processing time required for restoring the database. The invention is implemented in a system that includes a database cache processor for buffering pages of a database in the main memory of a data processing system, an audit processor for logging database updates to an audit file, and a recovery processor which uses the audit file to restore the database to a consistent state following a system failure. Each time an update is made to a database record, the audit processor saves a before-look and an after-look of a database record in an audit record. A before-look is the data stored in a record before the data was modified and an after-look is the data stored in a record after the data was modified.

A physical-redo-start value is maintained to indicate the location in the audit file at which the recovery processor must begin in order to restore the database to a consistent state. In general, the physical-redo-start value is updated based on the earliest written ones of the audit records resulting from transactions which modified the cached database pages. More particularly, each of the cached database pages has an associated oldest audit value which references the earliest written audit record for the cached database page. Each time a cached database page is written to non-volatile storage, its oldest audit value is compared against the oldest audit values for the other cached database pages, and if the referenced audit record was written to the audit file before all the other audit records as referenced by the other oldest audit values, the physical-redo-start value is updated to reference such oldest audit value.

In addition to the physical-redo-start value, the identity of the oldest active or "uncommitted" transaction is maintained while the system is processing transactions. Each time processing of a transaction is completed, the audit processor saves the transaction identifier of the oldest active transaction along with the identifier for the completed transaction in a commit type audit record.

The recovery processor proceeds in three phases. In the first phase, processing of the audit records in the audit file begins at the location referenced by the physical-redo-start value and ends with the last audit record in the audit file. The after-looks in these audit records are copied to the corresponding database records.

The second phase of processing the audit file begins with the last record in the audit file and ends with the last commit type audit record in the audit file. The before-look in these audit records are copied to the corresponding database records.

In the third and final phase of recovery processing, processing of the audit file begins with the last commit type audit record and ends with the begin-of-transaction type audit record for the oldest active transaction which is identified in the last commit type audit record. The recovery processor performs the inverse function of, or "rollback" operations associated with active transactions in this range of audit records. Upon completion of the third phase of processing, the database will be in a consistent state.

The object of avoiding having to perform all the operations necessary to insert a database record in order to "undelete" the record following a system failure is achieved by replacing the unique record number which associated with a record with the transaction identifier for the delete operation when performing a delete operation. By doing so, the physical space which was allocated for storage of the deleted record is temporarily unusable. If the system fails before the delete operation is completed and recovery of the deleted record is required, the step of physically allocating storage for restoring the record is eliminated because the data within the record is still in storage. After processing of the delete operation is complete, the physical space is made available for storing a different database record.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 8 is a diagram that illustrates a Transaction Control Table for use in the present invention;

DESCRIPTION OF THE PREFERRED EMBODIMENT

Figure 1:
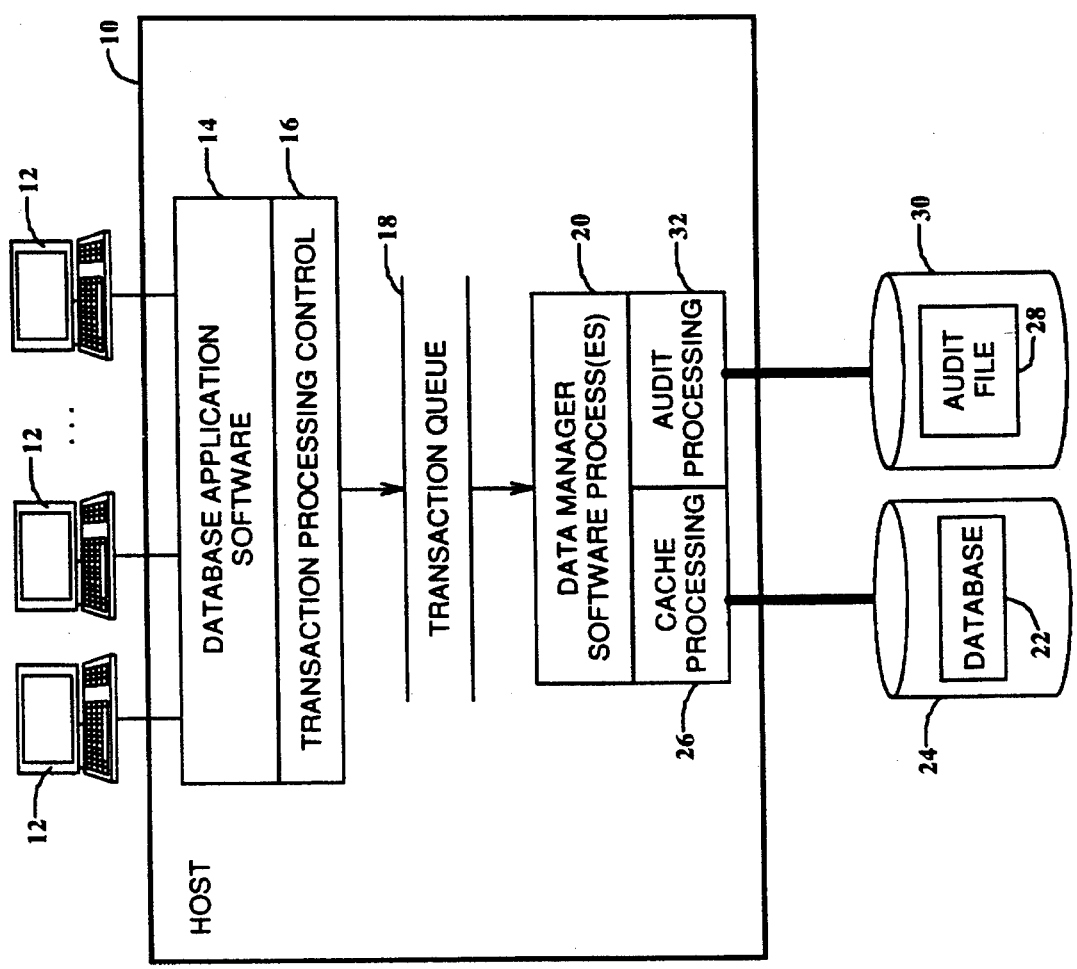
FIG. 1 is a logical block diagram of a Host data processing system and software components involved in processing transactions against a database.

FIG. 1 is a logical block diagram of a Host data processing system and software components involved in processing transactions against a database. The Host 10 may be a general purpose data processing system such as the U6000 Series data processing system which is commercially available from Unisys Corporation. One or more users may query or update database via Terminals 12.

Each of the Terminals 12 is interlaced with the Database Application Software 14 through system hardware and software (not shown and not part of the present invention). An example of the Database Application Software would be an airline reservation system. The Database Application Software is interlaced with the Transaction Processing Control software 16. Among other things, the Transaction Processing Control performs such tasks as assigning a transaction number to a transaction, dividing a transaction into smaller distinct units of work, returning requested information to the Database Application Software, and putting items of work for transactions into the Transaction Queue 18.

The Data Manager Software Process 20 is a software process that reads tasks from the Transaction Queue 18 and performs the specified task against the Database. While only one Data Manager Software Process is illustrated, it should be understood that in the software environment in which the present invention is implemented, that a plurality of Data Manager Software Processes execute concurrently for processing transactions. Once a Data Manager begins processing a transaction, it is dedicated to performing all subtasks associated with that transaction.

A Database 22 may consist of one or more logical files stored in a non-volatile storage medium such as a magnetic Disk 24. Because of the relatively slow access rate of non-volatile storage media, Cache Processing 24 is provided to cache selected portions of the Database in the main memory (not shown) of the Host 10. The logical portion of the Database that may be swapped between Disk 24 and the Host 10 main memory is referred to as a page. The Data Manager 20 includes a software interface to the Cache Processing whereby access to the cached data is provided.

The Database 22 with which the present invention may be used is logically organized with data pages and index pages. A data page consists of one or more data records that contain the information the end user has specified. The number of data records within a data page is dependent upon the chosen size of a data record and the chosen page size. An index page contains a fixed number of index records. Each index records "points to" or references either another index page or a data page. The index records are used to locate a particular data page to satisfy a database query. A binary search is then performed on the data page to locate the desired record.

The system of FIG. 1 also includes an Audit File 28 which, like the Database 22, is also stored in a non-volatile storage medium such as a Disk 30. Even though the Database 24 and Audit File 30 are shown as being stored on different Disks 30, they could be stored on the same disk. The Audit File contains records that are used to log updates that are made to the Database 22. If the Host 10 suffers a system type failure, such as a power failure, the records in the Audit File may be processed against the Database to restore it to a consistent state. The Database may be inconsistent at the time of system failure because updates to pages of the Database that are cached in the Host main memory may not have been written, or "destaged", to Disk 24.

Audit Processing 32 handles writing records to the Audit File 28 and is interlaced, via software, with the Data Manager 20. The Data Manager invokes Audit Processing when the Data Manager begins processing a transaction to write a Begin-Of-Transaction (BOT) type record to the Audit File, during processing of a transaction to log the function specified by a transaction as well as the before-look and after-look of a database record, and when processing of a transaction is complete to log a Commit type record. The before-look of a database record is the data that the record contained before the update was made, and the after-look of a database record is the data that the record contains after the update was made. For $B^+$-tree index records, only before-looks and after-looks are logged.

Figure 2:
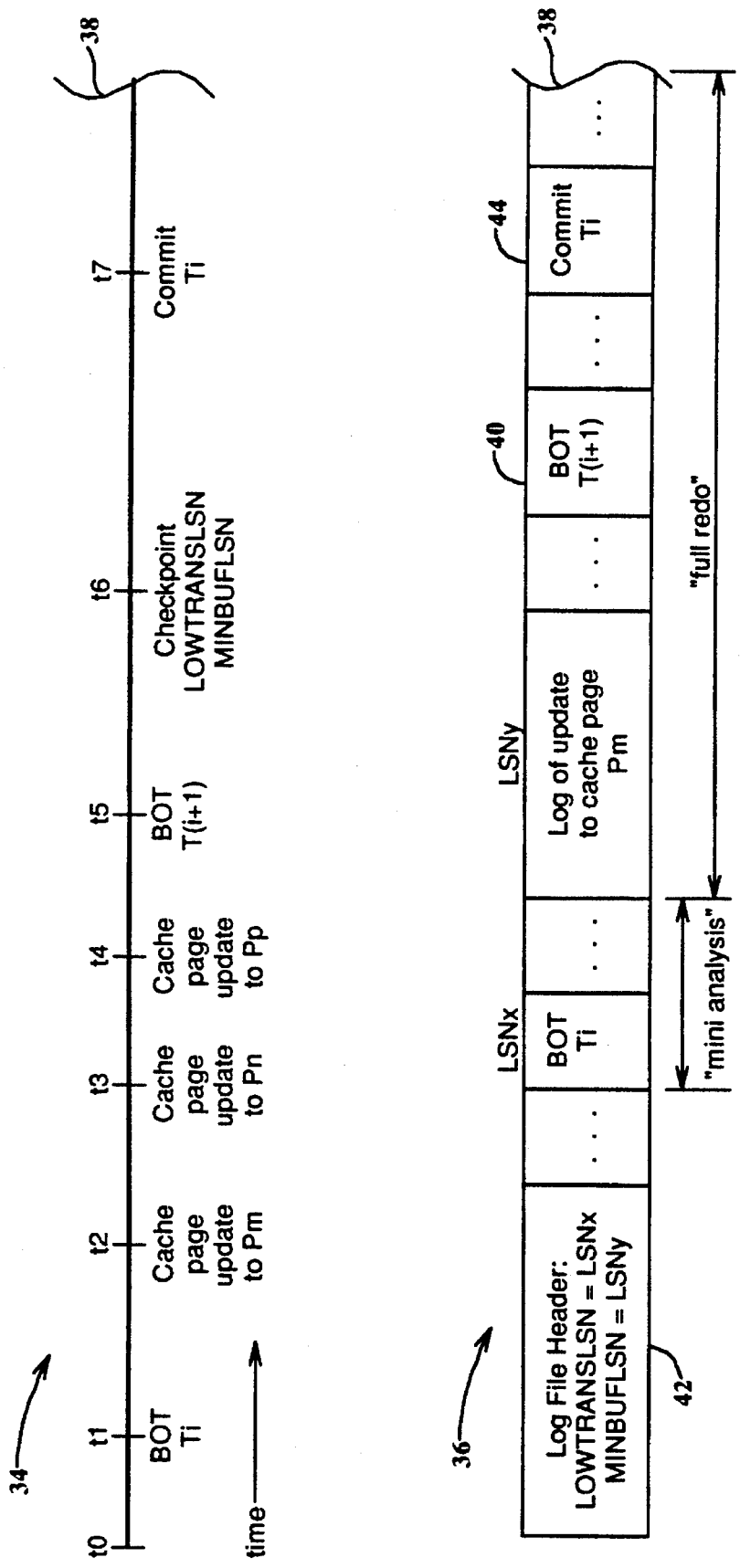
FIG. 2 is an example time line that illustrates a prior art "soft checkpointing" method.

FIG. 2 is an example time line that illustrates a prior art "soft checkpointing" method described in U.S. Pat. No. 5,043,866 to Myre, et al. FIG. 2 contains a Time-line 34 of assorted events occurring during transaction processing and a section of a Log File 36 as described in the prior art. The Time-line begins at an arbitrary time, t0, and continues to a point of system failure as designated by curved line 38. The Log File (in the present invention this is referenced as the "Audit File") contains a series of sequential records that are referenced by Logical Sequence Number (LSN). There are no log records in the Log File beyond the point of system failure designated by curved line 38.

Referring to the Time-line 34, at time t1 a Begin-of-Transaction (BOT) event is indicated for transaction Ti. Corresponding to this event is the log record designated LSNx in the Log File 36. The Log Record LSNx indicates that processing of transaction Ti has begun. At a later time t2, an update is made to the portion of the database stored in cache page Pm. The update to cache page Pm is logged to record LSNy in the Log File. Similarly, at times t3 and t4 updates are respectively made to cache pages Pn and Pp. While not shown, it will be understood that the updates to pages Pn and Pp are also logged to the Log File. At time t5, processing of transaction T(i+1) begins and the event is logged in log record 40.

The "soft checkpointing" of the prior art occurs at time t6. At periodic intervals, this soft checkpoint operation is performed. The soft checkpoint operation entails determining and saving LOWTRANSLSN and MINBUFLSN values. According to Myre, LOWTRANSLSN "is the LSN of the first log record written by the oldest in-flight transaction[,]" and MINBUFLSN is the LSN corresponding to the cache or "buffer" page "that was updated prior to any other dirty page." These two values are saved to the Log File Header 42 for use in recovering the database in the event of a system failure. When the time comes to recover the database, the minimum of these two values is used to determine how far back from the point in the Log File at which the system failure occurred that log records must be processed to recover the database.

As illustrated by the example of FIG. 2, the point in the Log File 36 that is identified by the soft checkpointing method may not always be optimal. The soft checkpointing method taught by Myre may not always be optimal because the oldest in-flight transaction identified at the Checkpoint (t6) may complete or "commit" between the checkpoint and the time of system failure. For example, at time t7, transaction Ti is complete and a commit type log record 44 is written to the Log File. Thus, even though when the system failed the Log File Header indicated that transaction Ti was the oldest in-flight transaction (as shown by LSNx), transaction T(i+1) was really the oldest in-flight transaction at the time of system failure.

While the method described by Myre may not lead to errors, it may result in unnecessary processing of the Log File thereby leading to an increase in the time required to recover a database. Continuing with the example of FIG. 2, Myre teaches to begin the recovery processing at log records LSNx, even though at the time of the system failure, transaction Ti was not the oldest in-flight transaction. Between LSNx and LSNy, Myre suggests a "mini-analysis" phase of processing to identify the start of new transactions. However, in the example this is unnecessary because transaction T(i+1) was the next transaction to start, and it did not start until after the record LSNy corresponding to the update of page Pm was written to the Log File. The present invention eliminates this mini-analysis phase of processing and provides the exact location in the Log File at which recovery processing must begin. In addition, the present invention eliminates the unnecessary processing associated with the actual operation of the soft checkpoint.

Before proceeding with the discussion of the present invention, FIGS. 4 through 9 will be described to provide related background information.

Figure 3:
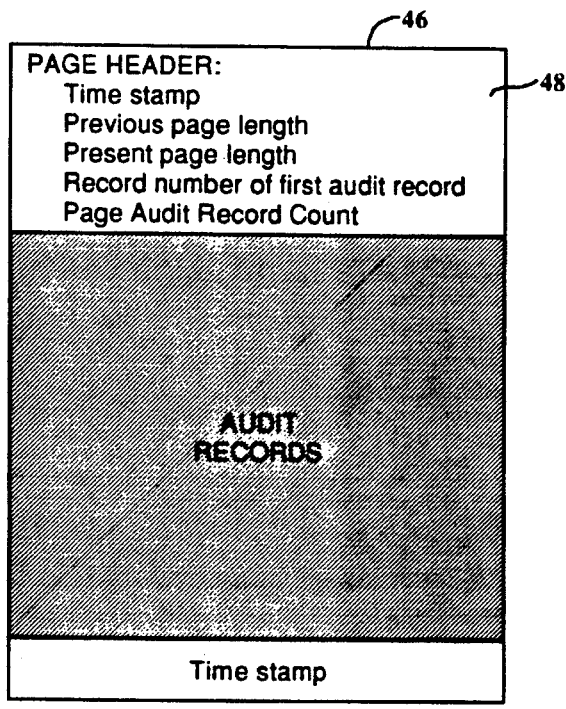
FIG. 3 is a diagram that illustrates the relationship between an Audit File Page and the audit records contained in an Audit File Page.

FIG. 3 is a diagram that illustrates the relationship between an Audit File Page 46 and the audit records contained in an Audit File Page. For processing efficiency the Audit Processing 32 buffers selected non-critical audit records in the main memory of the Host 10. The audit records are stored in a structure called an Audit Page. When a critical type audit record, for example a commit audit record, is written to an Audit Page, the Audit Page is written to Disk 30. The number of audit records contained in an Audit Page will vary according to the size of the particular audit records and the frequency of critical audit records.

Each Audit Page 46 includes a Page Header 48 that contains information related to the particular Audit Page. In particular, the Page Header includes a Time stamp to indicate the time at which the first record was written to the Audit File 28. The same Time stamp is included at the end of the Audit Page for use in determining whether the entire Audit Page was destaged before a system failure occurred. The Time stamp remains unchanged during a session of transaction processing, that is until a system failure occurs or an orderly system shutdown is performed and the system is thereafter restarted. Thus the Time stamp indicates a session for which recovery is performed. A Previous page length is stored in the Page Header to indicate the length of the previous Audit Page in the Audit File 28. This value is used in reading the Audit File backwards. The Present page length in the Page Header indicates the length of the Audit Page of which the Page Header is a part. The logical Record number of the first audit record in the Audit Page is stored in the Page Header and is used in scanning the Audit File.

Figure 4:
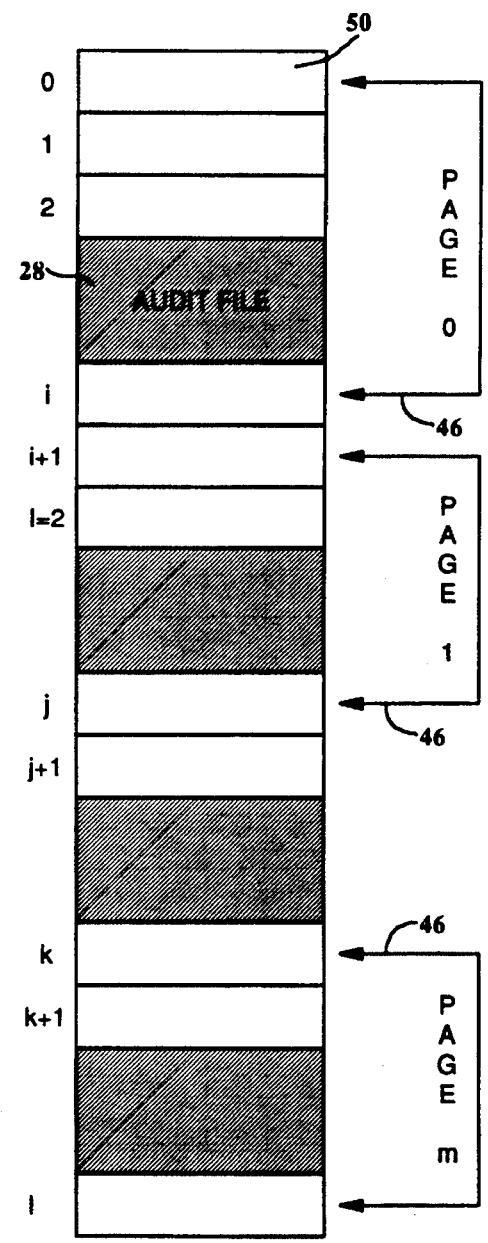
FIG. 4 is a diagram that illustrates the relationship between the Audit Pages contained in the Audit File and the Blocks in which the Audit Pages are stored.

FIG. 4 is a diagram that illustrates the relationship between the Audit Pages 46 contained in the Audit File 28 and the Blocks 50 in which the Audit Pages are stored. The Blocks are the unit of storage on the Disk 30 that the file system (not shown) physically allocates for storing file data. The Blocks of the Audit File are numbered relative to the beginning of the Audit File and are labelled 0-I. Audit Page 0 is stored across Blocks 0-i, Audit Page 1 is stored across Blocks (i+1)-j, and the last Audit Page m is stored across Blocks k-I. The Audit Processing 32 forces all Audit Pages to begin on a Block boundary.

Figure 5:
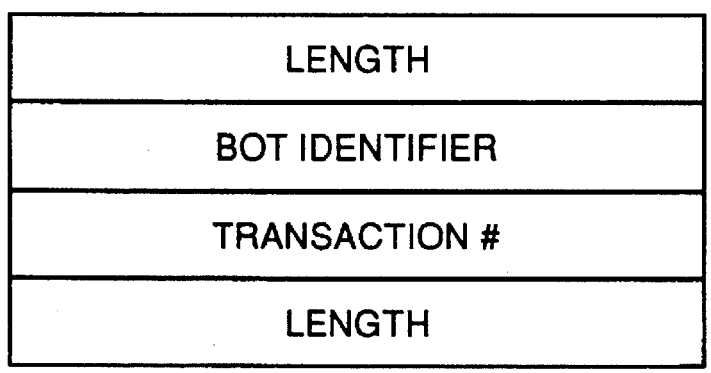
FIG. 5 is a diagram that shows the information contained in a Begin-Of-Transaction (BOT) Audit Record.
Figure 6:
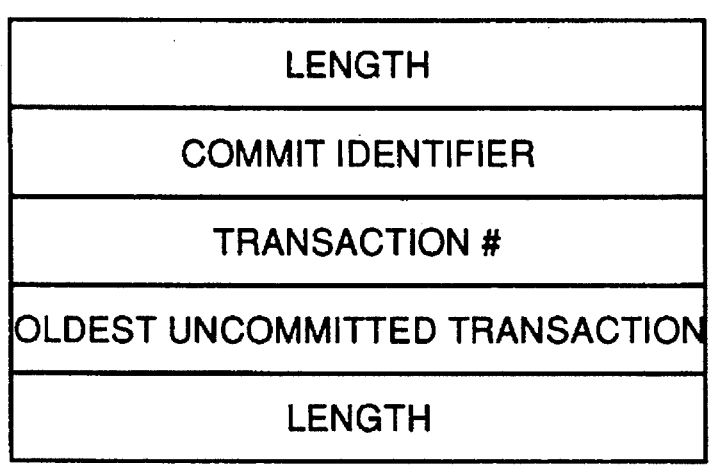
FIG. 6 is a diagram that shows the information contained in a Commit Audit Record.
Figure 7:
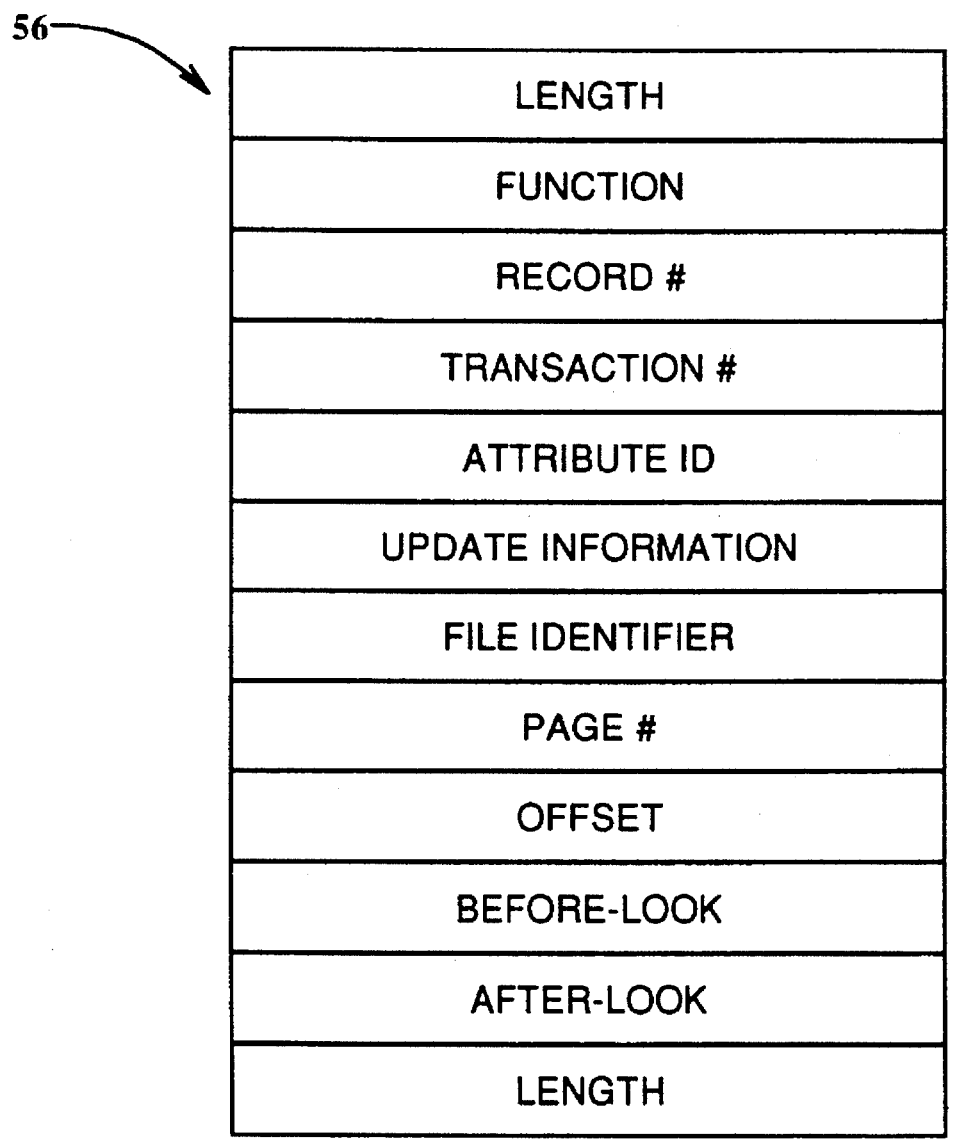
FIG. 7 is a diagram that shows the information contained in both Physical and Physical/Functional Audit Records.

FIGS. 5, 6, and 7 show the information contained in the different types of audit records. There are four types of audit records related to the present invention, a Begin-of-Transaction (BOT) Audit Record 52, a Commit Audit Record 54, a Physical Audit Record 56, and a Functional Audit Record, also designated by reference numeral 56. FIG. 5 is a diagram that shows the information contained in a Begin-Of-Transaction (BOT) Audit Record. A BOT Audit Record is stored when processing of a transaction first begins. For all types of Audit Records, the Length of the Audit Record is stored at the beginning and at the end of the record so that Audit Records may be read both forwards and backwards. The BOT Audit Record includes a BOT Identifier to indicate the type of Audit Record. The Transaction number in the BOT Audit Record is the unique identifier assigned to a transaction by the Transaction Processing Control 16.

FIG. 6 is a diagram that shows the information contained in a Commit Audit Record 54. A Commit Audit Record is written to the Audit File 28 when processing of all tasks associated with a transaction is complete. Prior to writing a Commit Audit Record for a transaction, the transaction is said to be "uncommitted" and once the Commit Audit Record is written the transaction has "committed." If a system failure occurs before a transaction has committed, all changes to the database caused by the uncommitted transaction must be undone at recovery time to ensure database consistency. Database changes caused by transactions that have committed are allowed to remain.

A Commit Audit Record 54 includes a Commit Identifier to indicate that the Audit Record is of type Commit. A Transaction number identifies the committed transaction. In the preferred embodiment of the present invention, the Commit Audit Record also includes the Transaction number that identifies the Oldest Uncommitted Transaction at the time that the Commit Audit Record was written to the Audit File 28. At recovery time, all Database updates audited in the Audit File after the last Commit Audit Record must be undone in order to return the Database to a consistent state because such updates are associated with uncommitted transactions. In addition, all Database updates audited in the Audit File between the BOT Audit Record of the Oldest Uncommitted Transaction and the last Commit Audit Record must be functionally undone or "rolled back" if such Database updates are associated with uncommitted transactions.

FIG. 7 is a diagram that shows the information contained in both Physical and Physical/Functional Audit Records 56. For modifications to a $B^+$-tree index page, the Before-look and After-look of index record(s) are stored in an Audit Record that is referred to as a "Physical" Audit record. The Before-look contains the information contained in the index record before the update occurred, and the After-look contains the information contained in the index record after the update occurred. Auditing of Insert, delete, and modify operations on a database record result in what is referred to as a "Physical/Functional" Audit Record. As in the BOT Audit Record 52 and the Commit Audit Record 54, the Length is stored at the beginning and the end of Physical and Physical/Functional Audit Records. If the Audit Record is of type Physical/Functional, the record will include a Function code, such as Insert, Delete, or Modify, to indicate the operation performed on the Database 22.

Physical/Function Audit Records 56 also include a Record Number. A unique Record Number is assigned to a data record of the Database 22 when the record is first created. The Transaction Number identifies the transaction that included the audited operation. The Attribute ID(s) (Identifiers) code is used to identify the particular portion(s) of a Database record that was affected by the audited operation. The Attribute ID code is used when a "rollback" operation (or the inverse of the function specified) is performed on a Functional Audit Record.

An Update Information field is used in a Physical/Functional Audit Record to indicate the particular data that is written to one or more attributes of a Database record. For example, in a student database record, the Update Information might include "Junior" when a student advances from the Sophomore to Junior level of education.

A File Identifier is included in Physical and Physical/Functional Audit Records 56 to indicate the logical file with which the audit record is associated. The Page Number indicates the logical offset from the beginning of the file of the page that contains the data or index record which is associated with the audit record. The Offset indicates the location relative to the beginning of the page which is identified by Page Number at which the record of the Database is stored.

Physical and Physical/Functional Audit Records include Before-look and After-look fields. For a Physical/Functional Audit Record, the Before-look contains the data present in a record of the Database 22 before the Update Information was written to the record, and the After-look contains the data present in the record after the Update Information was written to the record. For a Physical Audit Record, the Before-look contains the data present in an index record of the Database before the index record was modified and the After-look contains the data present in the index record after the index record was modified.

FIG. 8 is a diagram that illustrates a Transaction Control Table 58 for use in the present invention. The Transaction Control Table is used to track the status of transactions as they are processed. The Transaction Control Table includes Transaction Numbers to uniquely identify each active transaction, a Start Time that is associated with each active transaction to indicate the time that processing of the transaction commenced, and a Pointer for use in maintaining active entries in the Transaction Control Table. While only the Transaction Number and Start Time are shown as the information tracked for a particular transaction, it should be understood that other information relating to a transaction may be stored in the table which is beyond the scope of the present invention.

In the preferred embodiment, the Transaction Control Table 58 may contain up to 256 entries, corresponding to 256 active transactions. This parameter would be likely to vary in other implementations. Two linked lists (not shown) are maintained for managing the Transaction Control Table. A first list contains the active transactions, and the second list contains the entries in the Transaction Control Table that are unused. The Pointer code in the Transaction Control Table is used in maintaining the lists.

Figure 9:
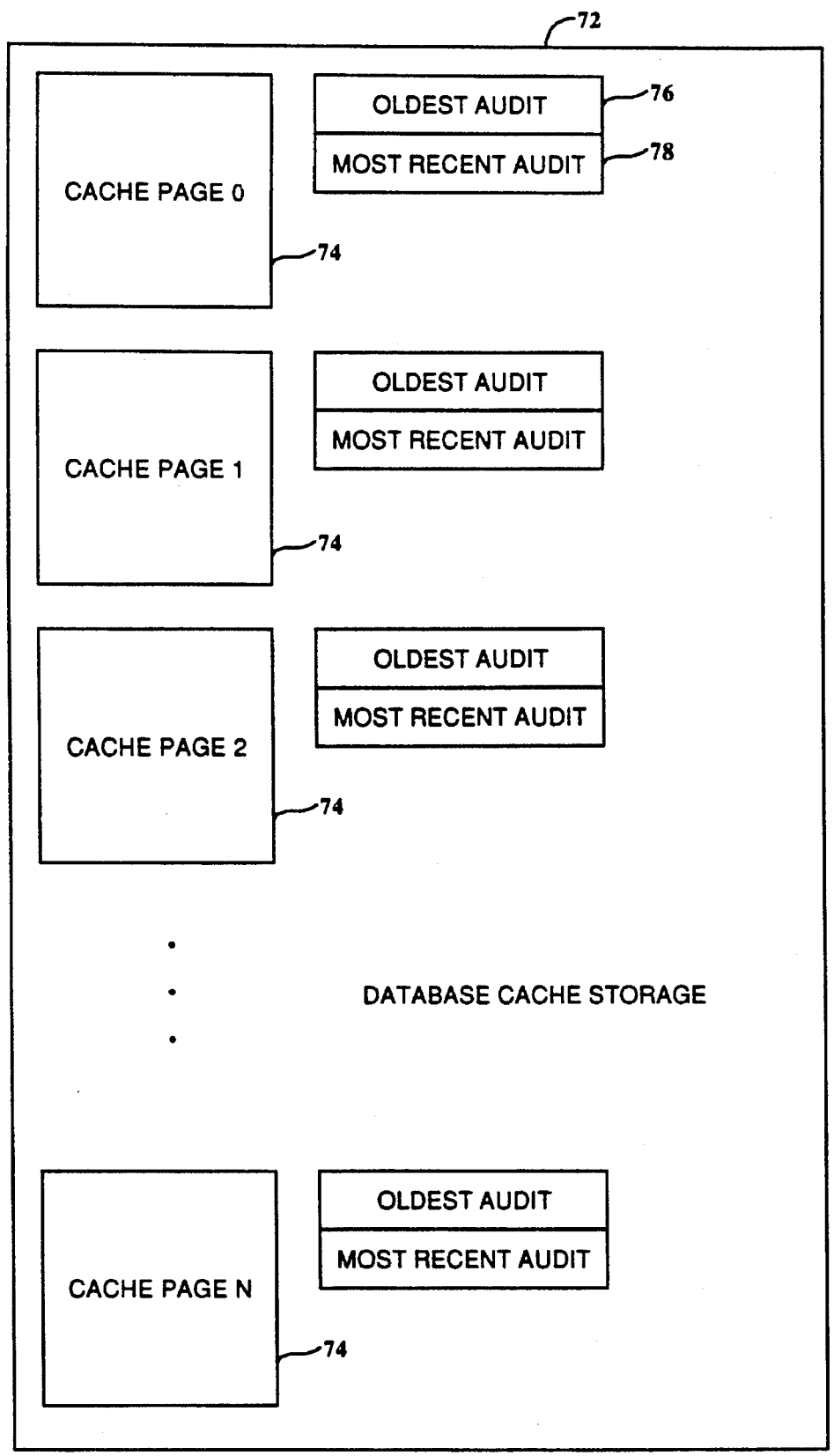
FIG. 9 is a diagram that illustrates Database Cache Storage and the Cache Pages that are available for buffering pages of the Database.

FIG. 9 is a diagram that illustrates Database Cache Storage 72 and the Cache Pages 74 that are available for buffering pages of the Database 22. The Database Cache Storage occupies a portion of the main memory of the Host 10 and is managed by Cache Processing 26.

The Cache Pages 74 shown are numbered 0 through n. Each of the Cache Pages has an associated pair of values, the Oldest Audit value 76 and the Most Recent Audit value 78. Each of the values addresses a Block 50 in the Audit File 28.

The Oldest Audit value addresses the Block that contains the first audit record associated with the page of the Database 22 since the page was read from Disk 24 and stored in a Cache Page 74, and the Most Recent Audit value addresses the Block that contains the last audit record associated with the page of the Database since the page was read from Disk and stored in a Cache Page.

The lowest of the Oldest Audit values 76 represents the location in the Audit File 28 before which all updates to pages of the Database 22 that were once present in Cache Pages 74 are known to have been stored to Disk 24. Therefore, the lowest of the Oldest Audit values is a suitable location in the Audit File to begin the recovery process. The lowest of the Oldest Audit values is referred to as the Physical-redo-start location in this preferred embodiment. Each time a Cache page is destaged to Disk, its Oldest Audit Value is compared to the Oldest Audit Values of the other Cache Pages. If it is the lowest of the Oldest Audit Values, then it is written as the Physical-redo-start location in the Audit File Control Block 94. Thus, it is known that when a system failure occurs, the Physical-redo-start location will reference the precise location in the Audit File at which the process for recovering the Database should begin.

Figure 10:
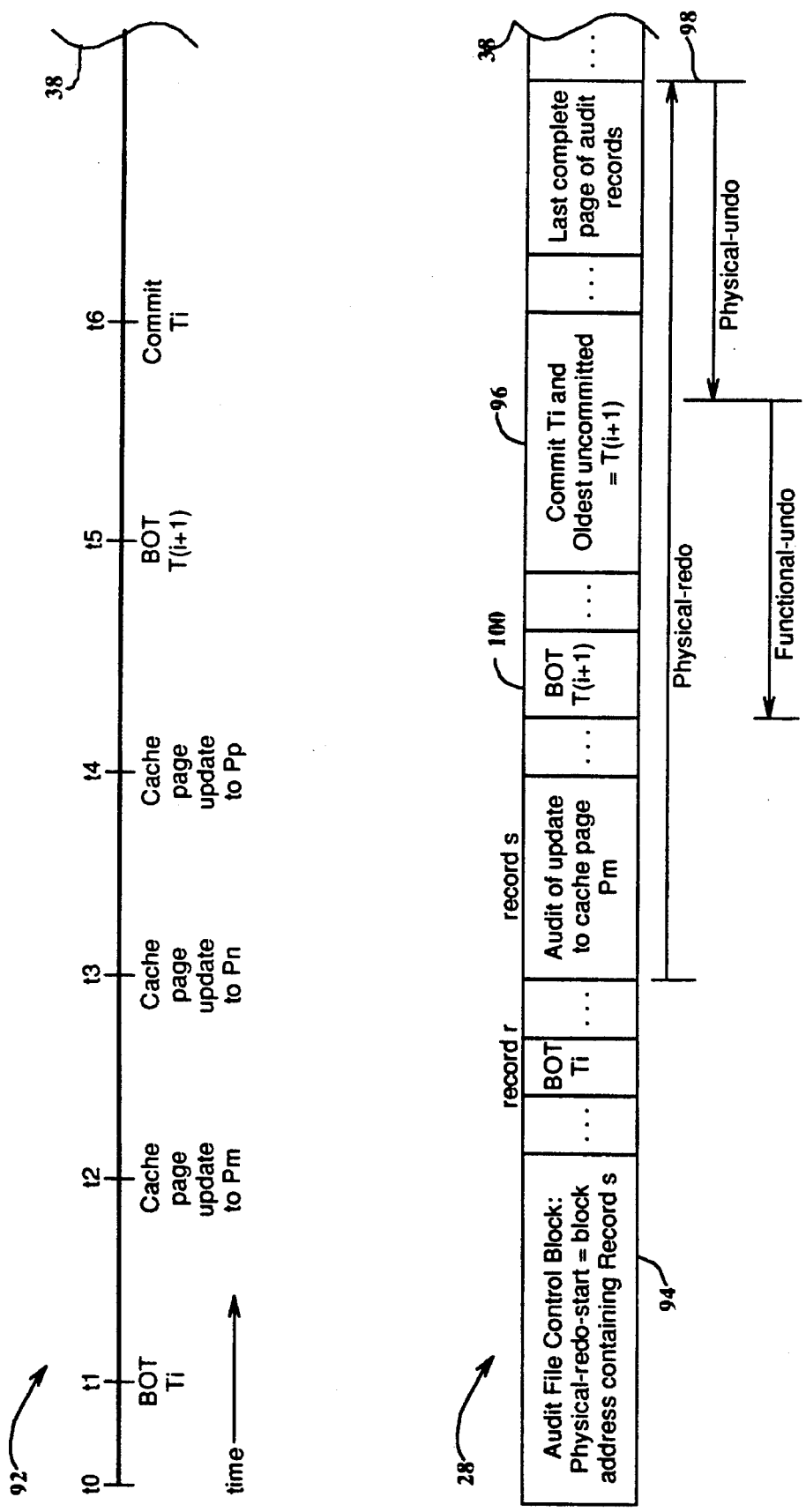
FIG. 10 is a time line that illustrates the example of FIG. 2 in the context of the present invention.

FIG. 10 is a time line that illustrates the example of FIG. 2 in the context of the present invention. FIG. 10 includes a Time-line 92 containing the same events as Time-line 34, except for the absence of a soft checkpoint. Similarly, FIG. 10 includes a log file, which the present invention and this specification references as an Audit File 28 consisting of a series of sequential audit records. The Audit File includes an Audit File Control Block 94 for storage of recovery related parameters. The events at times t1 through t5 are for the most part the same as those described in FIG. 2 and the discussion will not be repeated here.

A first difference to note between FIG. 2 and FIG. 10 is the auditing of the update to cache page Pm at t2. While not apparent from the Time-line 92 or the Audit File 28, the Audit File Control Block 94 contains the Physical-redo-start value that is analogous to the MINBUFLSN of FIG. 2. The Physical-redo-start value identifies the location in the Audit File before which all updates made to pages of the Database that were cached in the Database Cache Storage 72 are known to have been destaged to Disk 24. In the soft checkpointing method of FIG. 2, the MINBUFLSN is updated during the soft checkpoint processing. In the present invention, the Physical-redo-start value is updated only when a Cache Page 74 is written to Disk 24 and its Oldest Audit Value is the lowest of the Oldest Audit Values. By updating the Physical-redo-start value only when necessary, the information is guaranteed to be current and if no cache page is written to Disk, there is no unnecessary processing to determine the lowest Oldest Audit value 76.

The elimination of the soft checkpoint at time t6 in FIG. 2 from FIG. 10 should also be noted. The present invention eliminates the soft checkpoint by (1) updating the Physical-redo-start value only when it needs to be updated and (2) identifying the oldest uncommitted transaction each time a processing of a transaction is complete and a Commit Audit Record 54 is stored to the Audit File 28. For example, processing of transaction Ti is complete at t6 and the associated Commit Audit Record is written to the Audit File. The Commit Audit Record identifies the completed transaction Ti and the oldest uncommitted transaction at that time, T(i+1). The Oldest Uncommitted Transaction value in the Commit Audit Record indicates the location in the Audit File back to which operations audited for uncommitted transactions must be undone.

The phases of recovery processing are denoted as "Physical-redo," "Physical-undo," and "Functional-undo" below the Audit File 28. The Physical-redo phase of recovery processing entails physically copying the contents of the After-look from a Physical Audit Record 56 to the corresponding record of the Database 22 stored on Disk 24. The copy is performed only if the After-look is different from the Database record read from Disk. The Physical-redo processing of the Audit File begins at the location in the Audit Record referenced by the Physical-redo-start value contained in the Audit File Control Block 94. In this example the location specified is the file relative block address for Audit Record s. Audit Records preceding Record s need not be processed for recovery because it is known that all updates to the Database 22 that occurred prior to the update of the page of the Database in Cache Page Pm were written to Disk 24. The Physical-redo recovery processing proceeds until the end of the Audit File is reached. The end of the Audit File is denoted by reference numeral 98. The logical end of the file is considered to be the last complete Audit Page, that is the last Audit Page for which the Time Stamps at the beginning and end of the Audit Page match. Even though there may be audit records which follow the last complete Audit Page, the last record in the last complete Audit Page is considered the last Audit Record in the Audit File and is logically the end of the file.

The second phase of recovery processing is to undo Database 22 updates set forth in Physical Audit Records 56 between the end of the Audit File 48 and the last Commit Audit Record 54 in the Audit File. In this example Audit Record 96 is the Commit Audit Record for Transaction Ti. Physical-undo processing consists of copying the Before-look from a Physical Audit Record to the corresponding Database record stored on Disk 24. The copy is performed only if the Before-look is different from the Database record read from Disk.

The third phase of recovery processing is to perform a Functional-undo of operations for uncommitted transaction as set forth in Functional Audit Records 56 that precede the last Commit Audit Record 96 and succeed the BOT Audit Record 100 for the Oldest Uncommitted Transaction identified in Commit Audit Record 96. At the time of system failure, the precise location of the BOT Audit Record for the Oldest Uncommitted Transaction has been recorded in the last Commit Audit Record 96, and is therefore available for use during the recovery processing with only minimal overhead processing.

Figure 11:
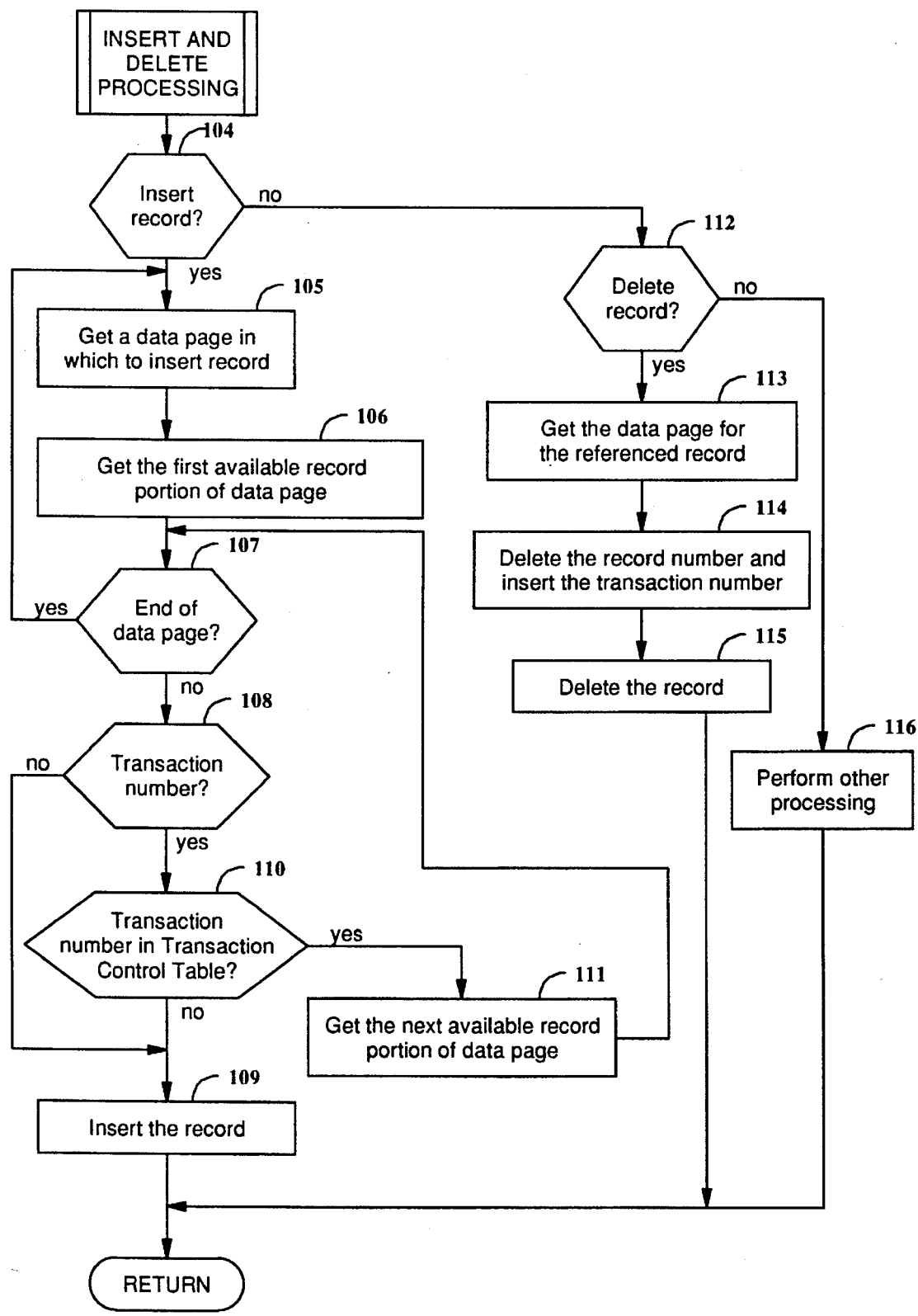
FIG. 11 is a flowchart of the Insert and Delete processing that is associated with the present invention.

FIG. 11 is a flowchart of the Insert and Delete processing that is associated with the present invention. Such processing provides for further optimization of recovery processing. The processing of FIG. 11 allows the Recovery Processing to be simplified for Physical/Functional Audit Records 56 as well as for Physical Audit Records. The processing is simplified in the sense that Physical-undo processing of Physical/Functional Audit Records 56 as well as Physical Audit Records is performed.

The database record insert processing and database record delete processing that is related to the present invention involves temporarily prohibiting use of a database record that is in the process of being deleted. The physical space of the deleted database record is not made available for storing another database record (such as for an "insert" operation for another transaction) until the transaction associated with the delete operation is committed. Thus, if a system failure occurs after a record is deleted and before the associated transaction commits, a full functional insert operation (to functionally-undo the delete) will not be required to restore the deleted record. The recovery processing performs a physical-undo of the deleted record (restores the record number) and during functional-undo processing restores the link to the undeleted record. This saves having to find a new location in a data page in which to store the formerly deleted record.

Processing begins at decision Step 104 where the operation to be performed on the Database 22 is tested. Control is directed to Step 105 where a data page of the Database is obtained if the operation specified is insert. The data page is then scanned for an available portion in which to insert the record information.

Step 106 obtains the first location in the data page in which a Database record is not presently stored. A free-bit is stored in each database record to indicate whether the data record is available for storage of data. If the free-bit is set, then the record may be available for inserting the desired record. Decision Step 107 first checks whether the end of the data page has been encountered. If the entire data page was processed without finding an available location for inserting the record, control is returned to Step 105 to obtain another data page for possible insertion of the record.

When a record is found for which its free-bit is set, control is directed to decision Step 108. Each data record includes a field which either contains a record number or a transaction number. The value of the free-bit indicates whether such field contains a record number or a transaction number. A unique record number is assigned when a record is first inserted in the Database 22. If the free-bit is not set, then the data record is presently in use and the unique record number is stored in the field. When the free-bit is set, the field contains a transaction number that identifies the transaction that associated in deleting the record. Decision Step 108 tests whether a Transaction number has been assigned to the portion of the data page under consideration for insertion of the record. A Transaction number is assigned when a record is being deleted so that another transaction may not use that portion of the data page to insert a record until the transaction involved in the delete operation has committed. If no such Transaction number is present in that portion under consideration, control is directed to Step 109 where the desired record is inserted in the Database 22. Otherwise, control is directed to decision Step 110.

Decision Step 110 tests whether the Transaction number that is present in a portion of a data page is present in the Transaction Control Table 58. A transaction number is maintained for a transaction in the Transaction Control Table until the transaction commits. Therefore, if the Transaction number from the portion of the data page is not present in the Transaction Control Table, the location in the data page may be used to insert a record and decision Step 110 directs control to Step 109 to insert the record. After the record is inserted in the data page, control is returned to the processing from which the Insert processing was invoked. That processing will then commit the transaction when appropriate.

If the Transaction number is present in the Transaction Control Table (the transaction has not yet committed), control is directed to Step 111 to obtain the next location in the data page that may be considered for inserting the desired record. Processing then continues at Step 107.

Decision Step 104 directs control to decision Step 112 if the operation is not insert record. Control is directed to Step 113 to obtain the appropriate data page if decision Step 112 finds that the operation to be performed is delete record. Step 114 sets the free-bit in the data record and stores the Transaction number of the transaction associated with the delete operation in the record. The set free-bit indicates that the record is being deleted and is not presently available for insertion of another database record if the corresponding transaction has not yet committed. After the record is deleted, control is directed to the processing from which the Delete processing was invoked. That processing will then commit the transaction when appropriate. If the operation to be performed is other than insert or delete, decision Step 112 directs control to Step 116 where the specified processing is performed (e.g. a modify operation).

Figure 12:
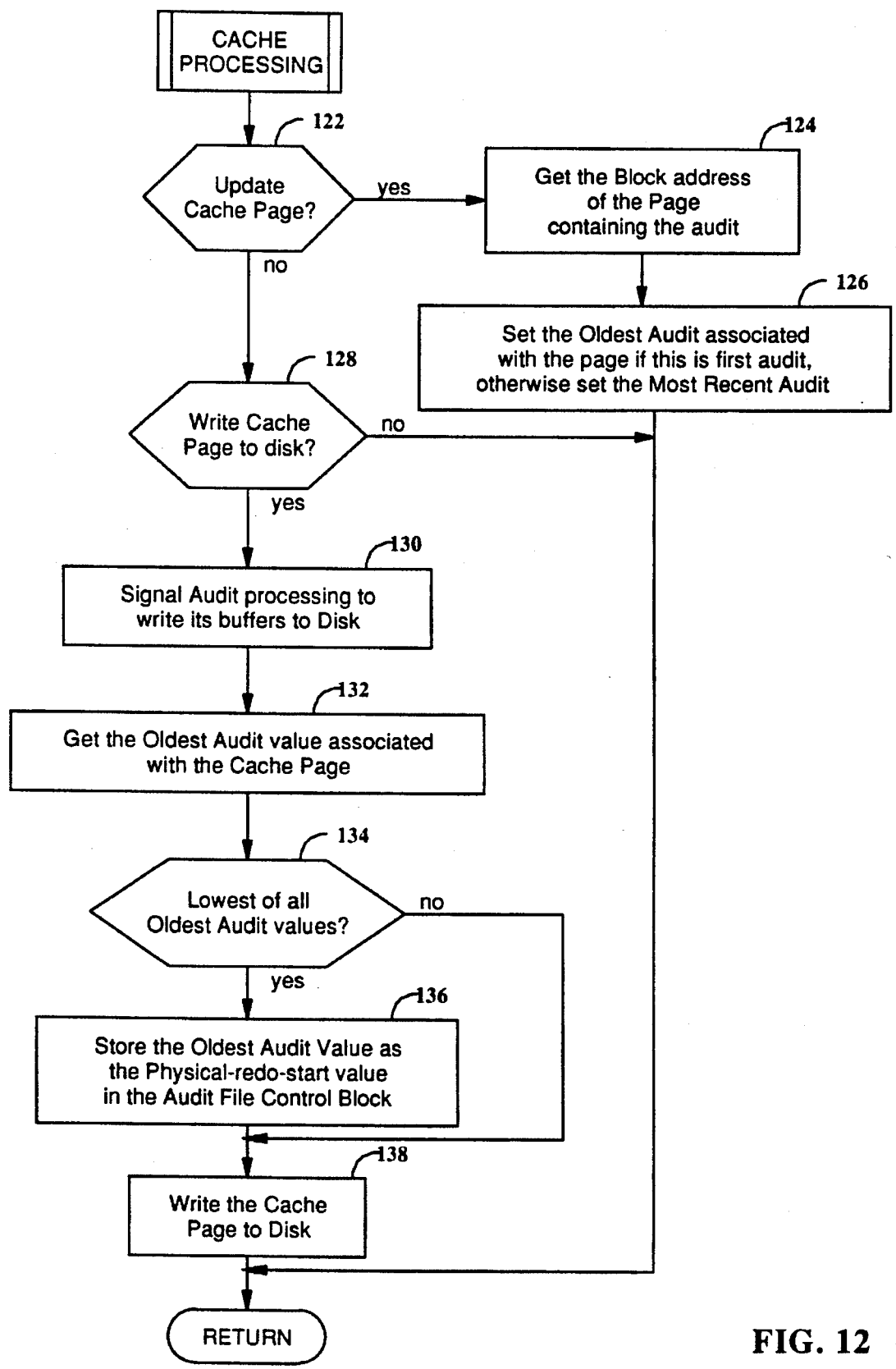
FIG. 12 is a flowchart of the Cache Processing that is related to the preferred embodiment of the present invention.

FIG. 12 is a flowchart of the Cache Processing 26 that is related to the preferred embodiment of the present invention. Decision Step 122 tests whether an update is being made to a Cache Page 74. When an update is made to a Cache Page, the Oldest Audit value 76 and the Most Recent Audit value 78 associated with the Cache Page must be updated accordingly. Step 124 obtains the Block 50 address of the Audit Page 46 to which the Audit Record associated with the update was written. If the update in process was the first update to the Cache Page, then Step 126 stores the Block address obtained at Step 124 as the Oldest Audit value. Otherwise, Step 124 stores the Block address as the Most Recent Audit value. Control is then returned to the processing from which Cache Processing was invoked.

Decision Step 128 tests whether a Cache Page 74 is to be written to Disk 24. If not, no cache operations are performed for the present invention. Otherwise, control is directed to Step 130 where the Audit Processing 32 is signalled to write the Audit Page 46 that it has buffered in the main memory of the Host 10 to Disk 30. The Audit Page is written to Disk before the Cache Page is written to Disk to ensure that all audit information that is associated with any updates to the Cache Page is present in the Audit File 28 so that the audited operations may be undone or redone if necessary during Recovery Processing.

After the Audit Processing 32 writes its buffers to Disk 30, Step 132 obtains the Oldest Audit Value that is associated with the Cache Page 74 to be written to Disk 24. Decision Step 134 tests whether Oldest Audit Value from Step 130 is the lowest of the Oldest Audit Values associated with the Cache Pages. If it is the lowest, control is directed to Step 136 where the Physical-redo-start value in the Audit File Control Block 94 is updated with the lowest Oldest Audit Value. This is used as the location in the Audit File 28 at which Physical-redo processing may begin. After the Physical-redo-start value is updated, Step 138 writes the Cache Page to Disk, and thereafter control is returned to the processing from which Cache Processing was invoked.

Figure 13:
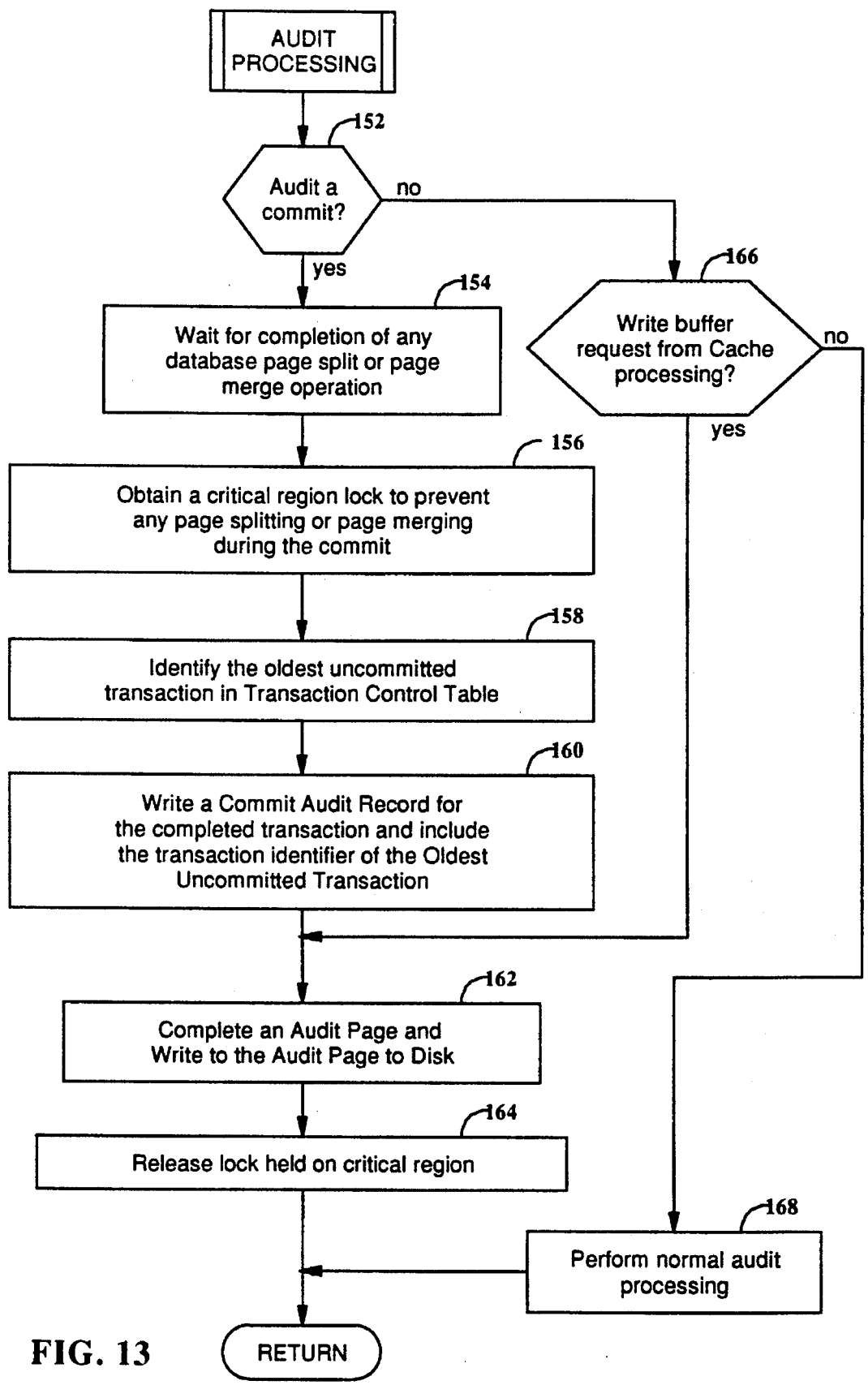
FIG. 13 is a flowchart of the Audit Processing associated with the present invention.

FIG. 13 is a flowchart of the Audit Processing 32 associated with the present invention. Decision Step 152 tests whether processing of a transaction is complete and a Commit Audit Record 54 is required. Control is directed to Step 154 if a commit is required. To make recovery processing straightforward, no splitting or merging of index pages of the Database 22 (such as may occur when records are added to or deleted from the Database and additional index pages are required or some index pages are no longer needed) is permitted during the processing of writing a Commit Audit Record. If splitting or merging of index pages was permitted during commit processing, then the Physical-redo and Physical-undo processing described above could not be guaranteed to restore the Database $B^+$-tree index to a consistent state because the physical recovery processing of the present invention uses the last Commit Audit Record 96 in the Audit File 28 as a reference point and the Audit Records that result from a page split or merge operation might reside before and after the Commit Audit Record. Therefore, no splitting or merging of the $B^+$-tree index is allowed during commit processing. Step 156 obtains a critical region lock to prevent any splitting or merging of index pages during the commit processing.

Step 158 identifies the oldest uncommitted transaction in the Transaction Control Table by searching the list of active transactions for the earliest Start Time, including the transaction for which a Commit Audit Record 54 is to be written. Step 160 writes a Commit Audit Record to the Audit File 28 for the complete transaction. Included in the Commit Audit Record is the Transaction Number of the oldest uncommitted transaction identified at Step 158. Because page splitting and merging was disallowed during the commit processing, Database recovery following a system failure may be accomplished in part by performing Physical-redo processing from the Physical-redo-start location to the point of system failure in the Audit File 28, and performing Physical-undo processing from the point of system failure in the Audit File back to the last Commit Audit Record. At this stage of the Recovery Processing, the $B^+$-tree is in a consistent state with all links in place. The remainder of recovery processing involves functionally undoing uncommitted transactions.

Step 162 writes any Audit Pages 46 to Disk that are buffered in the main memory of the Host 10, and Step 164 releases the critical region lock held for commit processing. Control is then returned to the processing from which the Audit Processing was invoked.

If the Cache Processing of FIG. 12 signals Audit Processing to write its buffers to Disk 30, decision Step 166 directs control to Step 162. Otherwise, control is directed to Step 168 where whatever other audit processing required is performed, and control is thereafter returned to the processing that invoked Audit Processing.

Figure 14:
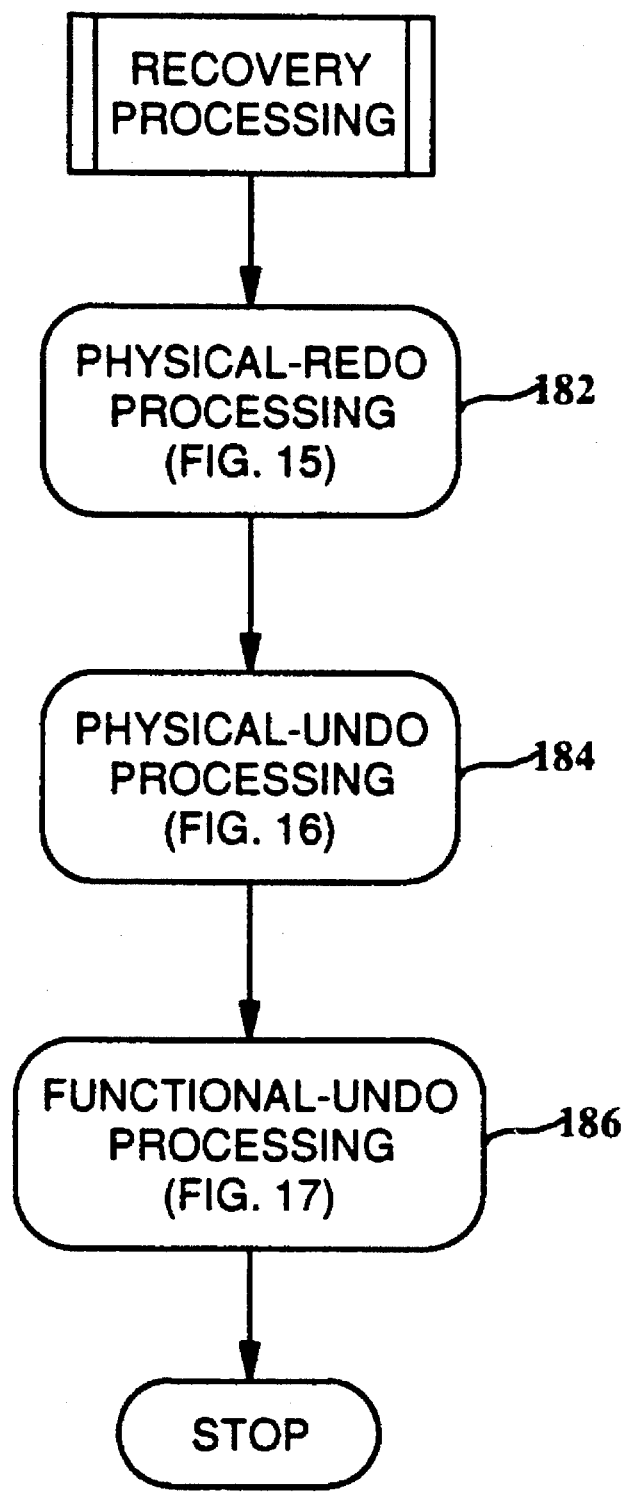
FIG. 14 is a high-level flowchart of the processing steps performed in restoring a Database to a consistent state following a system failure.

FIG. 14 is a high-level flowchart of the processing steps performed in restoring a Database 22 to a consistent state following a system failure. Cross reference may be made to FIG. 10 for an illustration of how the processing steps of FIG. 13 would be applied to an Audit File 28. Step 182 invokes Physical-redo Processing to recover Physical and Physical/Functional Audit Records 56 in the Audit File. As shown in FIG. 10, Physical-redo Processing begins at the location in the Audit File specified by the Physical-redo-start value in the Audit File Control Block 94. The After-looks in the Physical Audit Records are copied to the corresponding record in the Database. Physical Audit Records preceding the Physical-redo-start location need not be processed for recovery because it is known that any updates to Cache Pages 74 that were audited in the Audit File were written to Disk 24 and recovery of such pages is unnecessary.

The next phase of the Recovery Processing is Physical-undo Processing as shown by Step 184. Physical-undo Processing reads from the end of the Audit File 28 back toward the last Commit Audit Record 96. Because any updates to the Database that occurred after the last Commit Audit Record was written to the Audit File are associated with incomplete or "uncommitted" transactions, the changes audited in Physical and Physical/Functional Audit Records 56 must be undone. The Physical-undo Processing, consists of copying the Before-look from Physical Audit Records to the corresponding record of the Database. The Physical-undo Processing is complete when the last Commit Audit Record is reached.

The last phase of recovery processing is Functional-undo Processing as indicated by Step 186. For Physical/Functional Audit Records 56 that are associated with uncommitted transactions and are between the last Commit Audit Record 96 and the BOT Audit Record 100 indicated by the last Commit Audit Record, Functional-undo Processing performs the inverse (or "rollback") of the audited Function. Once the BOT Audit Record of the oldest uncommitted transaction at the time of system failure is reached, Functional-undo Processing is complete and the Database 22 has been restored to a consistent state.

Figure 15:
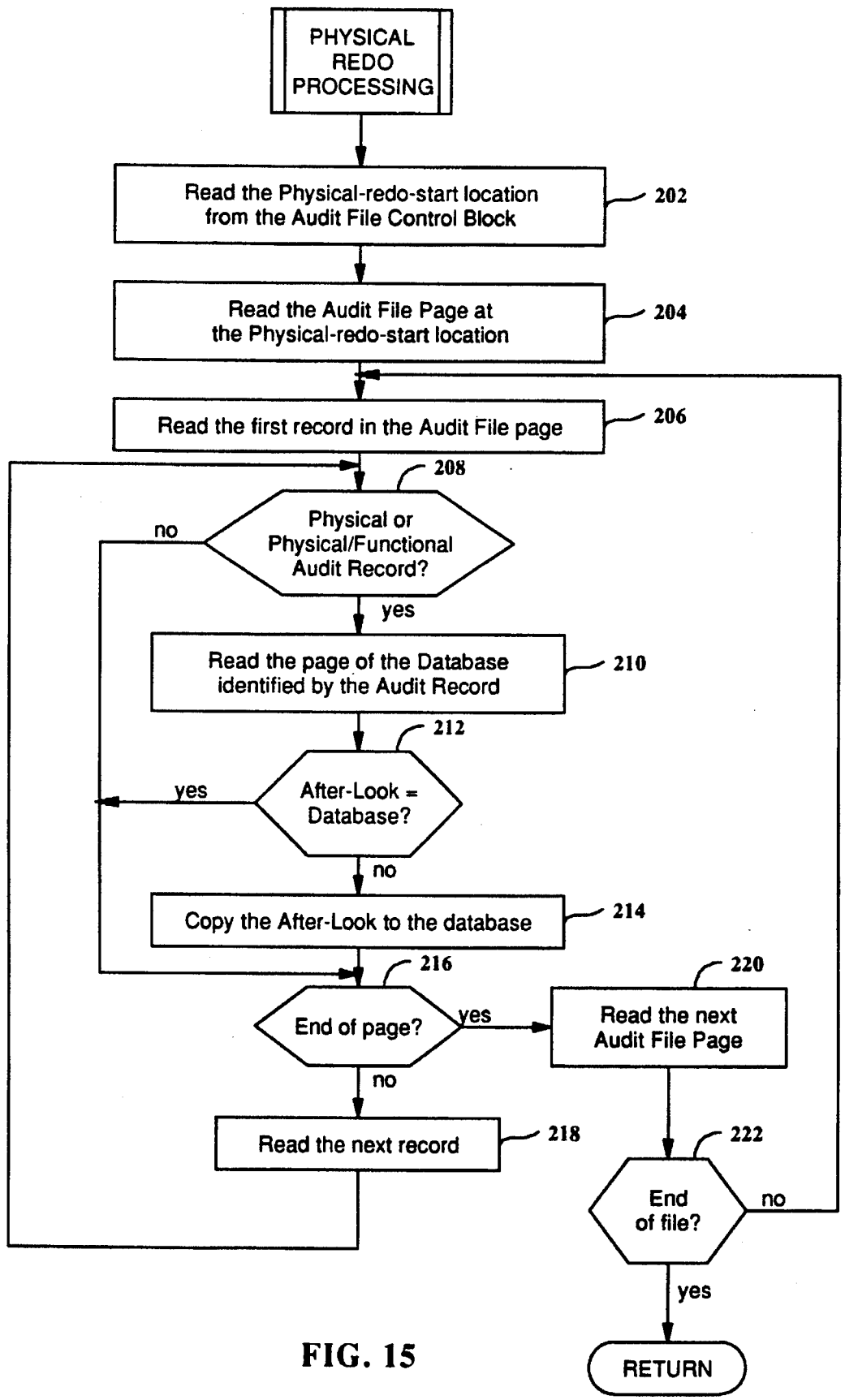
FIG. 15 is a more detailed flowchart of the Physical-redo Processing of the first phase of the process of recovering a Database.

FIG. 15 is a more detailed flowchart of the Physical-redo Processing of the first phase of the process of recovering a Database 22. Beginning at the Physical-redo-start location specified in the Audit File Control Block 94 and proceeding to the end of the Audit File 28, Physical-redo Processing copies the After-look from Physical Audit Records 56 to the corresponding location in the Database. Step 202 reads the Physical-redo-start value from the Audit File Control Block, and Step 204 reads the Audit File Page 46 at the location specified by the Physical-redo-start value. The first audit record of the Audit File Page is obtained at Step 206.

If the audit record is a Physical or Physical/Functional Audit Record 56, decision Step 208 directs control to Step 210 where the page of the Database 22 corresponding to the Physical or Physical/Functional Audit Record is read from Disk 24. If the After-look in the Physical or Physical/Functional Audit Record is does not equal its corresponding portion of the Database, decision Step 212 directs control to Step 214 where the After-look is copied to its location in the Database and written to Disk 24. If the audit record is not a Physical or Physical/Functional Audit Record, decision Step 208 directs control to decision Step 216. Likewise, if the After-look is equal to the corresponding portion of the Database, decision Step 212 directs control to decision Step 216.

Decision Step 216 tests whether the end of the Audit File Page 46 has been reached. If there are more records in the page to process, control is directed to Step 218 to read the next Audit Record and control is returned to decision Step 208. Otherwise, decision Step 216 directs control to Step 220 to read the next Audit File Page from the Audit File 28. If the end of the Audit File has not been reached, decision Step 222 returns control to Step 206. The end of the Audit File is detected when the Time Stamp at the end of the Audit Page 46 does not match the Time Stamp in the Page Header 48. When the end of the Audit File is reached, control is returned to the processing from which Physical-redo Processing was invoked.

Figure 16:
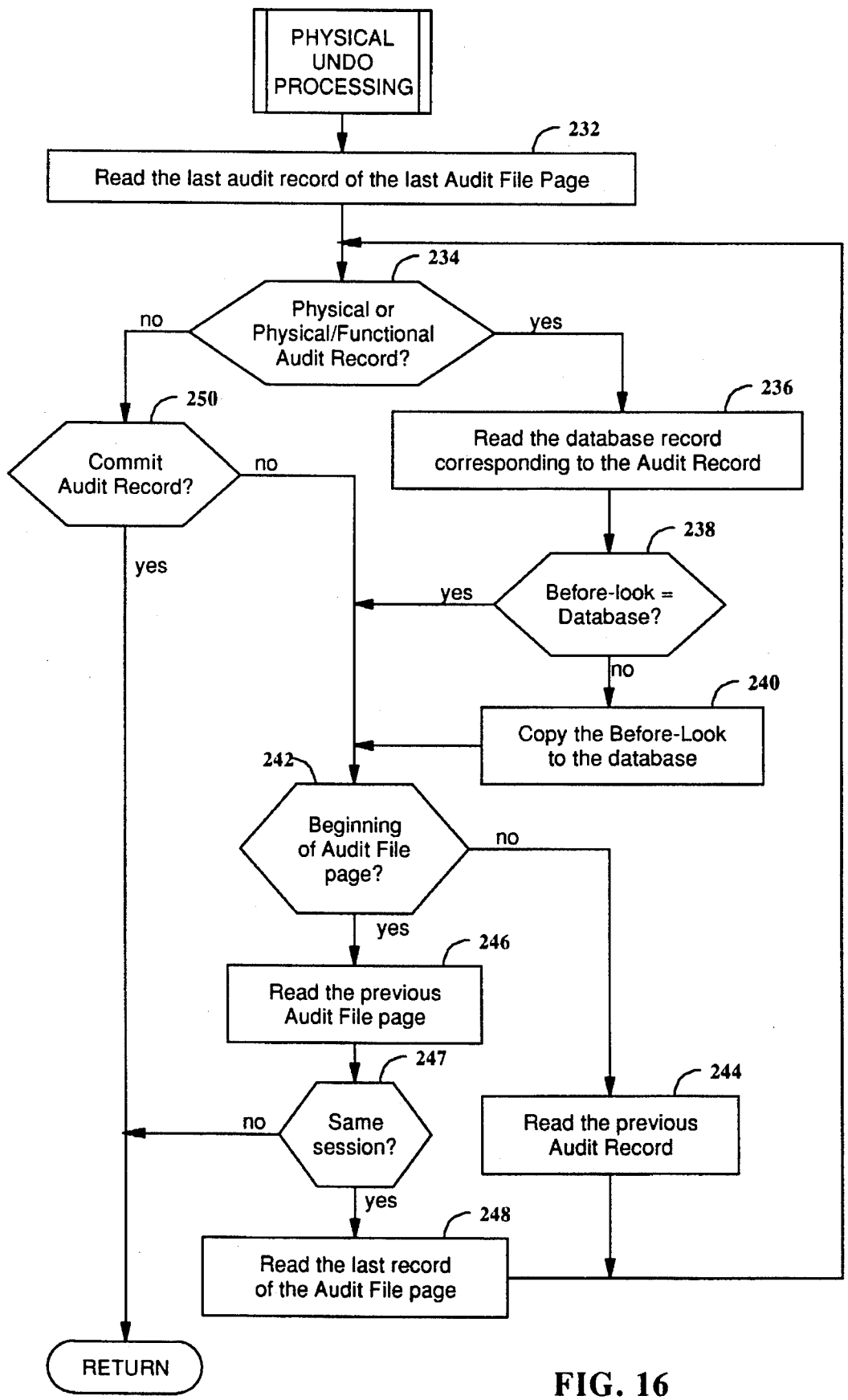
FIG. 16 is a flowchart of the processing associated with Physical-undo Processing.

FIG. 16 is a flowchart of the processing associated with Physical-undo Processing. For each Physical Audit Record 56 from the end of the Audit File 28 back to the last Commit Audit Record 96, Physical-undo Processing copies the Before-look to the corresponding location in the Database 22. Step 232 reads the last audit record in the last complete Audit File Page 74 in the Audit File. Control is directed to Step 236 if decision Step 234 finds that the audit record is a Physical or Physical/Functional Audit Record. Step 236 reads the page of the Database referenced by the Physical or Physical/Functional Audit Record. Decision Step 238 directs control to Step 240 if the Before-look in the audit record is not equal to its corresponding portion of the Database. Step 240 copies the Before-look from the audit record to the referenced location in the Database and writes the page to Disk 24. After the page has been written to Disk, control is directed to decision Step 242. If the Before-look is equal to its corresponding portion of the Database, there is no need to update the page of the Database stored on Disk and decision Step 238 directs control to decision Step 242.

Decision Step 242 tests whether the beginning of the Audit File Page 46 has been reached. Control is directed to Step 244 to obtain the previous audit record if the beginning of the Audit File Page has not been reached. Otherwise, decision Step 242 directs control to Step 246 to read the previous Audit File Page. Decision Step 247 tests whether the Audit Page read at Step 246 is for the session for which recovery is being performed, that is, whether the Time Stamp of the Audit Page is equal to the Time Stamp from the last complete Audit Page in the Audit File. If the Audit Page is associated with the session for which recovery is being performed, control is directed to Step 248. Otherwise, Physical-undo Processing is complete and control is returned. Step 248 obtains the last audit record in the Audit File Page read at Step 246. Control is then returned to decision Step 234 to process the previous record in the Audit File.

If decision Step 234 finds that the Audit record is neither a Physical nor a Physical/Functional Audit record, control is directed to decision Step to determine whether a Commit Audit Record 54 has been encountered. The first Commit Audit Record located in this backward reading of the Audit File 28 would be the last Commit Audit Record 96 in the example of FIG. 10. When the last Commit Audit Record is reached or an Audit Page 46 with a different Time Stamp is encountered, decision Step 250 direct control to be returned to the processing from which the Physical-undo Processing was invoked. Otherwise, control is directed to decision Step 242 to get the previous audit record.

Figure 17:
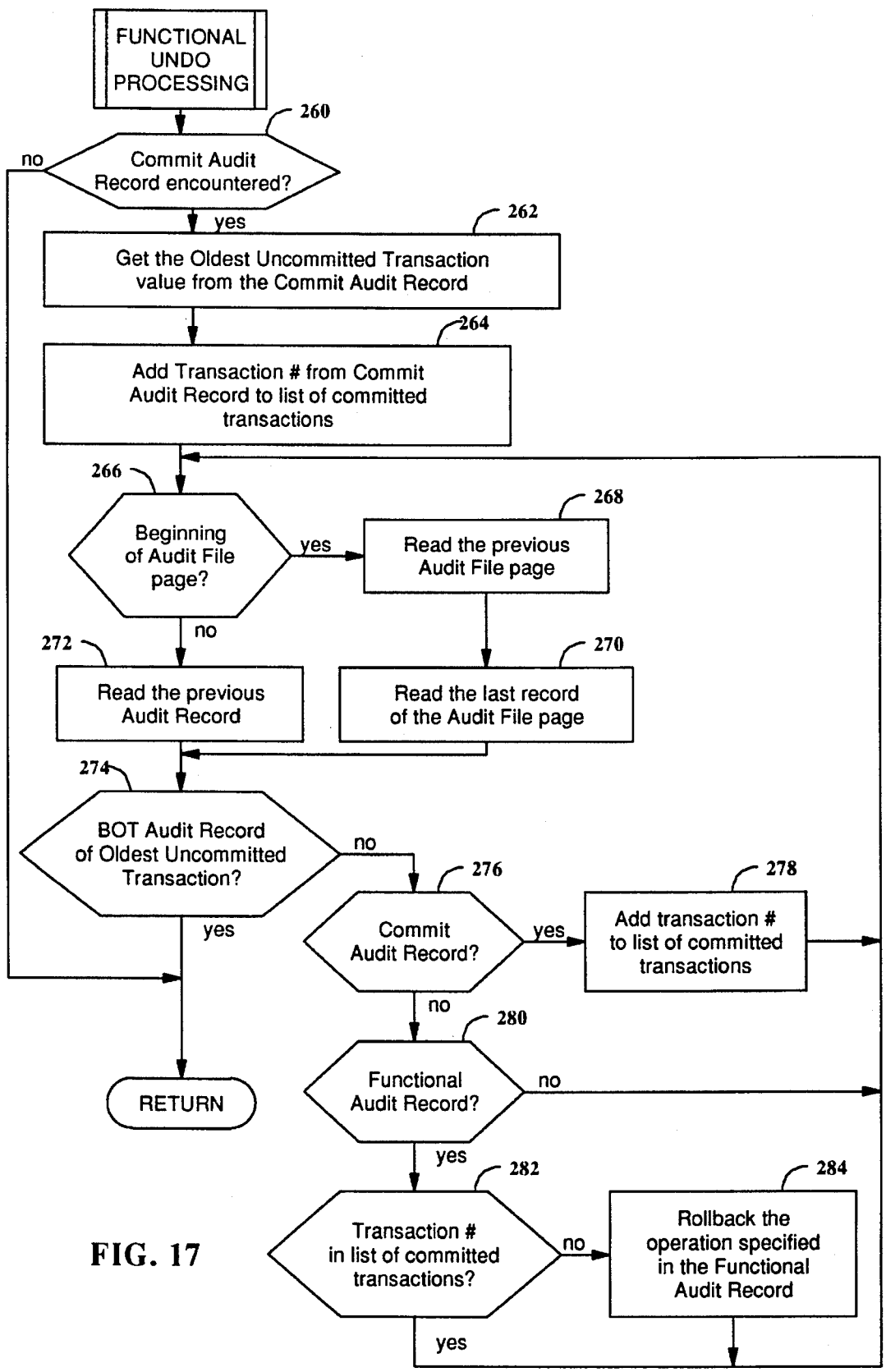
FIG. 17 is a flowchart of Functional-undo Processing which performs a rollback of operations of uncommitted transactions and completes restoration of a Database to a consistent state.

FIG. 17 is a flowchart of Functional-undo Processing which performs a rollback (or the inverse function) of operations of uncommitted transactions and completes restoration of a Database 22 to a consistent state. Beginning with the last Commit Audit Record 96 and ending with the BOT Audit Record 100 of the oldest uncommitted transaction, Function-undo Processing reads the Audit File 28 backwards and pedorms a rollback of operations associated with uncommitted transactions. Decision Step 260 tests whether Physical-undo Processing encountered a Commit Audit Record 96. If a Commit Audit Record was not found, then Functional-undo Processing is unnecessary and control is returned. Otherwise, control is directed to Step 262.

Step 262 reads the Oldest Uncommitted Transaction value from the Commit Audit Record. The Transaction Number in the Commit Audit Record that identifies the completed transaction is added to a list of committed transactions at Step 264. The list of committed transactions is used during Functional-undo processing to determine whether a rollback is required for an operation associated with a transaction.

Decision Step 266 tests whether the beginning of Audit File Page 46 has been reached. If so, control is directed to Step 268 where the previous Audit File Page is read, and Step 270 obtains the last record in the newly read Audit File Page for further processing. Otherwise, control is directed to Step 272 to read the previous record in the Audit File.

Decision Step 274 tests whether the BOT Audit Record 100 of the Oldest Uncommitted Transaction has been reached. If not, control is directed to decision Step 276 to test whether the record is a Commit Audit Record 54. For a Commit Audit Record, control is directed to Step 278 where the Transaction Number is added to the list of committed transactions so that a rollback of operations associated with the committed transaction is not performed. Control is then directed to Step 266 to obtain the previous record to process. Decision Step 276 directs control to decision Step 280 if the record is not a Commit Audit Record.

Control is directed to Step 266 by decision Step 280 if it is determined that the record is not a Functional Audit Record 56. Otherwise, processing proceeds at decision Step 282 to test whether the Transaction Number specified in the Functional Audit Record is present in the list of committed transactions. If it is, no rollback is performed. If the transaction has not committed, control is directed to Step 284 where a rollback of the operation specified in the Functional Audit Record is performed. Control is then directed to Step 266 to obtain the previous record in the Audit File 28.

Decision Step 274 directs control to be returned to the processing from which Functional-undo Processing was invoked when the BOT Audit Record 100 of the Oldest Uncommitted Transaction is reached. At this point in the recovery processing, the Database 22 has been returned to a consistent state.

Having described the preferred embodiment of the invention in the drawings and accompanying description, those skilled in the art will recognize that various modifications to the exemplary embodiment could be made without departing from the scope and spirit of the claims set forth below:

That which is claimed is:

1. In a database management system capable of having multiple transactions in process simultaneously and executing on a data processing system having a main memory, wherein a database is organized with data pages that include data records and index pages that include index records to reference other index pages or the data pages, the database management system including cache processing for caching selected portions of a database in the main memory from non-volatile storage and audit processing for maintaining an audit file of updates to the database and the status of transactions in process, wherein a cache page is the portion of main memory allocable by the cache processing for storing selected database pages, and the audit processing sequentially writes audit records to the audit file when an update is made to the database and maintains an audit file control block for use in processing the audit file when the database requires recovery, a method of operating the data processing system for maintaining an audit file comprising the steps of:

maintaining an oldest audit value for each page of the database that is cached in the main memory of the data processing system, wherein each said oldest audit value references the earliest written audit record resulting from a modification to the corresponding cached database page;

maintaining a physical-redo-start value in the audit file control block, wherein said physical-redo-start value references the location in the audit file at which recovery processing may begin;

when a database page that is cached in the main memory of the database processing system is to be written to non-volatile storage, updating said physical-redo-start value with an oldest audit value which is associated with said database page to be written to the non-volatile storage if said oldest audit value which is associated with said database page to be written to the non-volatile storage is less than all other oldest audit values which are associated with the other cached database pages;

performing steps (a) and (b) for a completed transaction, wherein said completed transaction is a transaction for which processing is complete;

(a) identifying the oldest transaction currently in process for which processing is incomplete, wherein said oldest transaction is the transaction for which processing began at a time which is earlier than the other transactions in process; and (b) writing a commit type audit record to the audit file to indicate that processing of said completed transaction is complete, wherein said commit type audit record identifies said completed transaction and said oldest transaction from said identifying step.

2. The method of claim 1, further including the steps of:

removing a record number that is stored in a database record when a delete operation is performed on the database record, wherein said record number uniquely identifies the database record;

storing a transaction number which is associated with the transaction for which said delete operation is performed in the database record; and disabling storage of data in the database record until processing is complete the transaction for which said delete operation is performed.

3. The method of claim 1, further including the step of prohibiting any splitting or merging of database index pages while a commit type audit record is being written to the audit file.

4. The method of claim 2, further including the step of prohibiting any splitting or merging of database index pages while a commit type audit record is being written to the audit file.

5. In a database management system capable of having multiple transactions in process simultaneously and executing on a data processing system having a main memory, wherein a database is organized with data pages that include data records and index pages that include index records to reference other index pages or the data pages, the database management system including audit processing for sequentially writing audit records to an audit file and maintaining an audit file control block for use in processing the audit file when the database requires recovery, wherein the audit records contain after-looks and before-looks of database records and functional operations performed on the database, the system further including cache processing for caching selected portions of a database in the main memory and for maintaining a physical-redo-start value, wherein the physical-redo-start value references a location in the audit file at which recovery of the database may begin and a cache page is the portion of main memory allocable by cache processing for storing selected database pages, a method of operating the data processing system for recovering a database using the audit file following failure of the data processing system, comprising the steps of:

for each of the audit records which contain an after-look of a database record and beginning with the audit record referenced by the physical-redo-start value and ending with the last audit record in the audit file, performing step (a), (a) copying each after-look to a corresponding record in the database;

for each of the audit records which contain a before-look of a database record and beginning with the last audit record in the audit file and ending when a commit type audit record is encountered, wherein said commit type audit record identifies a transaction for which processing was completed and the oldest transaction for which processing was incomplete at the time said commit type audit record was written, performing steps (b) and (c), (b) reading an audit record; and (c) copying each before-look to a corresponding record in the database; and for each audit record that contains a functional operation that was performed on a database record and beginning with said commit type audit record and ending when a begin-of-transaction type audit record is encountered which corresponds to said oldest transaction identified in said commit type audit record, performing steps (d) and (e), (d) reading an audit record; and (e) performing the inverse of each functional operation if processing of the corresponding transaction was incomplete at the time of the system failure.

6. The method of claim 5, further comprising the steps of:

maintaining a physical-redo-start value in the audit file control block, wherein said physical-redo-start value references the location in the audit file at which recovery processing may begin;

when a database page that is cached in the main memory of the database processing system is to be written to non-volatile storage, updating said physical-redo-start value with an oldest audit value which is associated with said database page to be written to the non-volatile storage if said oldest audit value for said database page to be written to the non-volatile storage is less than all other oldest audit values which are associated with the other cached database pages;

performing steps (f) and (g) for a completed transaction, wherein said completed transaction is a transaction for which processing is complete;

(f) identifying the oldest transaction currently in process for which processing is incomplete, wherein said oldest transaction is the transaction for which processing began at a time which is earlier than the other transactions in process; and (g) writing a commit type audit record to the audit file to indicate that processing of said completed transaction is complete, wherein said commit type audit record identifies said completed transaction and said oldest transaction from said identifying step.

7. The method of claim 6, further including the steps of:

removing a record number that is stored in a database record when a delete operation is performed on the database record, wherein said record number uniquely identifies the database record;

storing a transaction number which is associated with the transaction for which said delete operation is performed in the database record; and disabling storage of data in the database record until processing is completed for said transaction for which said delete operation is performed.

8. The method of claim 7, further including the step of prohibiting any splitting or merging of database index pages while a commit type audit record is being written to the audit file.

9. The method of claim 6, further including the step of prohibiting any splitting or merging of database index pages while a commit type audit record is being written to the audit file, wherein a commit type audit record indicates that processing of a transaction is complete.

10. In a database management system capable of having multiple transactions in process simultaneously and executing on a data processing system having a main memory, wherein a database is organized with data pages that include data records and index pages that include index records to reference other index pages or the data pages, the database management system including cache processing for caching selected portions of a database in the main memory from non-volatile storage and audit processing for maintaining an audit file of updates to the database and the status of transactions in process, wherein a cache page is the portion of main memory allocable by the cache processing for storing selected database pages, and the audit processing sequentially writes audit records to the audit file when an update is made to the database and maintains an audit file control block with the audit file for use in processing the audit file when the database requires recovery, a method of operating the data processing system for maintaining an audit file comprising the steps of:

maintaining an oldest audit value for each page of the database that is cached in the main memory of the data processing system, wherein each said oldest audit value references the earliest written audit record resulting from a modification to the corresponding cached database page;

when a database page that is cached in the main memory of the database processing system is to be written to non-volatile storage, performing steps (a) and (b), (a) writing all audit records which are buffered in main memory in the audit file in non-volatile storage; and (b) storing an oldest audit value which is associated with said database page to be written to non-volatile storage in the audit file control block if said oldest audit value which is associated with said database page to be written to non-volatile storage is less than all other oldest audit values;

performing steps (c) through (g) for each completed transaction, wherein said completed transaction is a transaction for which processing is complete;

(c) waiting for completion of any splitting or merging of database index pages;

(d) prohibiting any splitting or merging of database index pages while a commit type audit record is being written to the audit file, wherein a commit type audit record indicates that processing of a transaction is complete;

(e) identifying the oldest transaction currently in process for which processing is incomplete, wherein said oldest transaction is the transaction for which processing began at a time which is earlier than the other transactions in process;

(f) writing a commit type audit record to the audit file to indicate that processing of said completed transaction is complete, wherein said commit type audit record identifies said completed transaction and said oldest transaction from said identifying step; and (g) writing all audit records which are buffered in main memory in the audit file in non-volatile storage.

11. The method of claim 10, further including the steps of:

removing a record number that is stored in a database record when a delete operation is performed on a database record, wherein said record number uniquely identifies the database record;

storing the transaction number which is associated with a transaction for which said delete operation is performed in the database record; and disabling storage of data in the database record until processing is complete for said transaction for which said delete operation is performed.

12. In a database management system capable of having multiple transactions in process simultaneously and executing on a data processing system having a main memory, wherein a database is organized with data pages that include data records and index pages that include index records to reference other index pages or the data pages, the database management system including audit processing for sequentially writing audit records to an audit file and maintaining an audit file control block for use in processing the audit file when the database requires recovery, wherein the audit records contain after-looks, before-looks, and functional operations performed on the database, the system further including cache processing for caching selected portions of a database in the main memory and for maintaining a physical-redo-start value, wherein the physical-redo-start value references a location in the audit file at which recovery of the database may begin and a cache page is the portion of main memory allocable by cache processing for storing selected database pages, a method of operating the data processing system for recovering a database using the audit file following failure of the data processing system, comprising the steps of:

(a) reading the physical-redo-start value, wherein said physical-redo-start value indicates the location in the audit file at which physical recovery may be started;

(b) reading the audit record in the audit file at the location specified by said physical-redo-start value as the current audit record;

(c) copying the after-look from said current audit record to the corresponding database record if said current audit record is a physical or physical/functional type audit record and said after-look does not equal the corresponding database record;

(d) reading the audit record following said current audit record as a new current audit record;

(e) repeating steps (c) through (e) until the last audit record in the audit is processed;

(f) copying the before-look contained in said current audit record to the corresponding database record if said current audit record is a physical or physical/functional type audit record;

(g) reading the audit record that precedes said current audit record as the new current audit record;

(h) repeating steps (f) through (h) until said current audit record is a commit type audit record, wherein said commit type audit record identifies a transaction for which processing is complete and contains an oldest uncommitted transaction value, wherein said oldest uncommitted transaction value identifies the transaction for which, at the time of writing said commit type audit record, processing began at a time which is earlier than the other transactions in process;

(i) reading said oldest uncommitted transaction value from said commit type audit record;

(j) reading the audit record which precedes said current audit record as the new current audit record;

(k) performing the inverse of a functional operation specified in said current audit record if said current audit record is a physical/functional type audit record for transaction for which processing was not complete at the time of the system failure;

(l) reading the audit record which precedes said current audit record as the new current audit record; and (m) repeating steps (k) through (m) until said current audit record is a begin-of-transaction type audit record that identifies the transaction specified by said oldest uncommitted transaction value.

13. In a database management system capable of processing multiple transactions simultaneously and executing on a data processing system having a main memory, wherein a database is organized with data pages that include data records and index pages that include index records to reference other index pages or the data pages, the database management system including a cache processor for caching selected portions of a database in the main memory from non-volatile storage and an audit processor for maintaining an audit file of updates to the database and the status of transactions in process, wherein a cache page is the portion of main memory allocable by the cache processing for storing selected database pages, and the audit processor sequentially writes audit records to the audit file when an update is made to the database and maintains an audit file control block for use in processing the audit file when the database requires recovery, an apparatus for maintaining an audit file comprising:

maintenance means for maintaining an oldest audit value for each page of the database that is cached in the main memory of the data processing system, wherein each said oldest audit value references the earliest written audit record resulting from a modification to the corresponding cached database page;

update means interfaced with each said oldest audit value and responsive to the cache processor for updating a physical-redo-start value in the audit file control block when a database page that is cached in the main memory is to be written to non-volatile storage if an oldest audit value which is associated with said database page to be written to non-volatile storage is less than all other oldest audit values which is associated with the other cached database pages;

identification means interfaced with the audit processor for identifying an oldest transaction currently in process for which processing is incomplete at the time processing of another transaction is complete, wherein said oldest transaction is the transaction for which processing began at a time which is earlier than the other transactions in process; and write means interfaced with the audit processor for writing a commit type audit record to the audit file when processing of a transaction is complete, wherein said commit type audit record identifies the transaction for which processing is complete and said oldest transaction currently in process.

14. The apparatus of claim 13, further including:

insertion means interfaced with the cache processor for inserting a record in the database;

deletion means interfaced with the cache processor for deleting a record in the database;

removal means responsive to said deletion means for removing a record number that is stored in the database record when a delete operation is performed on the database record, wherein said record number uniquely identifies the database record;

storage means responsive to said deletion means for storing the transaction number that associated with a transaction for which said delete operation is performed in the database record; and disable means interlaced with the database record for disabling storage of data in said database record until processing of said transaction for which said delete operation is performed is complete.

15. The apparatus of claim 13, further including prohibition means interfaced with the audit processor for prohibiting any splitting or merging of database index pages while a commit type audit record is being written to the audit file, wherein a commit type audit record indicates that processing of a transaction is complete.

16. The method of claim 14, further including prohibition means interfaced with the audit processor for prohibiting any splitting or merging of database index pages while a commit type audit record is being written to the audit file, wherein a commit type audit record indicates that processing of a transaction is complete.

17. In a database management system capable of having multiple transactions in process simultaneously and executing on a data processing system having a main memory, wherein a database is organized with data pages that include data records and index pages that include index records to reference other index pages or the data pages, the database management system including an audit processor for sequentially writing audit records to an audit file when the database requires recovery, wherein the audit records contain after-looks and before-looks of database records and functional operations performed on the database, the system further including a cache processor for caching selected portions of a database in the main memory from non-volatile storage and for maintaining a physical-redo-start value, wherein a cache page is the portion of main memory allocable by the cache processor for storing selected database pages, an apparatus for recovering a database using the audit file, comprising:

first read means for reading audit records from the audit file beginning at the location referenced by the physical-redo-start value and ending with the last audit record in the audit file;

first copy means responsive to the audit records from said first read means for copying after-looks from the audit records to corresponding database records;

second read means for reading audit records from the audit file in reverse order of entry beginning with the last audit record in the audit file and ending when a commit type audit record is encountered, wherein said commit type audit record identifies a transaction for which processing is complete and includes an oldest uncommitted transaction value, wherein said oldest uncommitted transaction value identifies a transaction, which at the time said commit type audit record was written, was the transaction for which processing was started before all other transactions in process;

second copy means responsive to the audit records from said second read means for copying before-looks from the audit records to corresponding database records;

third read means for reading audit records from the audit file in reverse order of entry beginning with said commit type audit record and ending with a begin-of-transaction type audit record that corresponds to said oldest uncommitted transaction value from said commit type audit record; and rollback means responsive to the audit records from said third read means for performing the inverse of functional operations specified in the audit records which are associated with transactions for which processing was not complete at the time of the system failure.

18. The apparatus of claim 17, further comprising:

maintenance means for maintaining an oldest audit value for each page of the database that is cached in the main memory of the data processing system, wherein each said oldest audit value references the earliest written audit record resulting from a modification to the corresponding cached database page;

update means interfaced with each said oldest audit value and responsive to the cache processor for updating a physical-redo-start value in the audit file control block when a database page that is cached in the main memory is to be written to non-volatile storage if an oldest audit value which is associated with said database page to be written to non-volatile storage is less than all other oldest audit values which are associated with the other cached database pages;

identification means interfaced with the audit processor for identifying an oldest transaction currently in process for which processing is incomplete at the time processing of another transaction is complete, wherein said oldest transaction is the transaction for which processing began at a time which is earlier than the other transactions in process; and write means for writing a commit type audit record to the audit file when processing of a transaction is complete, wherein said commit type audit record identifies the transaction for which processing is complete and said oldest transaction currently in process.

19. The apparatus of claim 18, further including the steps of:

insertion means interfaced with the cache processor for inserting a record in the database;

deletion means interfaced with the cache processor for deleting a record in the database;

removal means responsive to said deletion means for removing a record number that is stored in a database record when a delete operation is performed on said database record, wherein said record number uniquely identifies said database record;

storage means responsive to said deletion means for storing the transaction number that associated with a transaction for which said delete operation is performed in said database record; and disable means interlaced with said database record for disabling storage of data in said database record until processing of said transaction for which said delete operation is performed is complete.

20. The apparatus of claim 19, further including prohibition means interfaced with the audit processor for prohibiting any splitting or merging of database index pages while a commit type audit record is being written to the audit file, wherein a commit type audit record indicates that processing of a transaction is complete.

21. The apparatus of claim 18, further including prohibition means interfaced with the audit processor for prohibiting any splitting or merging of database index pages while a commit type audit record is being written to the audit file, wherein a commit type audit record indicates that processing of a transaction is complete.

* * * * *